US00RE39317E

(19) United States
(12) Reissued Patent
Sakagawa

(10) Patent Number: US RE39,317 E
(45) Date of Reissued Patent: Oct. 3, 2006

(54) SYSTEM FOR SERVER OBTAINING TERMINAL ADDRESS VIA SEARCHING ADDRESS TABLE OR VIA BROADCASTING TO ALL TERMINALS THROUGH EXCHANGE IN RESPONSE TO TERMINAL ADDRESS INTERROGATION REQUEST

(75) Inventor: Kazuo Sakagawa, Nagoya (JP)

(73) Assignee: Fujitsu Limited, Kawasaki (JP)

(21) Appl. No.: 09/427,945

(22) Filed: Oct. 26, 1999

Related U.S. Patent Documents

Reissue of:
(64) Patent No.: 5,774,662
Issued: Jun. 30, 1998
Appl. No.: 08/446,496
Filed: May 22, 1995

(30) Foreign Application Priority Data

Jul. 5, 1994 (JP) ..... 6-153381

(51) Int. Cl.
*G06F 15/173* (2006.01)

(52) U.S. Cl. ..... 370/395.54; 709/224; 709/230; 709/245; 709/223; 710/3; 711/202

(58) Field of Classification Search ..... 370/396, 370/410, 255, 395.54; 709/245, 227, 228, 709/229, 220, 221, 222, 223, 224, 230; 710/3; 711/202
See application file for complete search history.

(56) References Cited

U.S. PATENT DOCUMENTS 4,836,317 A * 6/1989 Straussmann ..... 178/2 R
5,021,943 A * 6/1991 Grimes ..... 709/228

(Continued)

FOREIGN PATENT DOCUMENTS

| | | |
|---|---|---|
| JP | 61-140243 | 6/1986 |
| JP | 3-35637 | 2/1991 |
| JP | 4-1333 | * 11/1992 |
| JP | 6-85830 | 3/1994 |
| JP | 7-74767 | 3/1995 |

OTHER PUBLICATIONS

LAN Emulation Over ATM Version 1.0 af–lane–0021.000 Jan. 1995.

ATM Forum 94–0526 Join Protocol; Jun. 2, 1994.

ATM Forum 94–0527 Address Resolution Protocol; Jun. 2, 1994.

Newman, P. "ATM Local Area Networks" IEEE Communications Magazine, U.S., IEEE Service Center, vol. 32, No. 3, Mar. 1, 1994, pp. 86–98.

(Continued)

*Primary Examiner*—Le Hien Luu
(74) *Attorney, Agent, or Firm*—Katten Muchin Rosenman LLP

(57) ABSTRACT

A originating terminal sends an ATM address interrogation request to a server if the ATM address of another party's terminal is unknown at the time of communication. Upon receiving the ATM address interrogation request from the terminal, the server refers to an ATM address table, searches the table for an ATM address corresponding to a protocol address contained in the interrogation request and notifies the originating terminal of this ATM address. If an ATM address corresponding to the protocol address has not been registered in the ATM address table, the server transfers (broadcasts) the ATM address interrogation request to all terminals. The server notifies the originating terminal of an ATM address obtained by an answer in response to this interrogation request and registers the ATM address in the ATM address table.

37 Claims, 22 Drawing Sheets

U.S. PATENT DOCUMENTS

| | | | | | |
|---|---|---|---|---|---|
| 5,157,390 | A | * | 10/1992 | Yoshie et al. | 340/825.52 |
| 5,278,829 | A | * | 1/1994 | Dunlap | 370/257 |
| 5,410,540 | A | | 4/1995 | Aiki et al. | 370/390 |
| 5,425,026 | A | * | 6/1995 | Mori | 370/410 |
| 5,440,547 | A | * | 8/1995 | Easki et al. | 370/395.3 |
| 5,444,702 | A | * | 8/1995 | Burnett et al. | 370/254 |
| 5,450,406 | A | * | 9/1995 | Esaki et al. | 370/396 |
| 5,506,847 | A | * | 4/1996 | Shobatake | 370/338 |
| 5,633,869 | A | * | 5/1997 | Burnett et al. | 370/396 |
| 5,732,071 | A | * | 3/1998 | Saito et al. | 370/255 |

OTHER PUBLICATIONS

Castro R. et al. "Support of Data Communications in an ATM LAN", Proceedings of the IFIP TC6 International Conference on Information Networks and Data Communication, NL Amsterdam, vol. Conf. 5, Apr. 18, 1994, pp. 277–295.

Masafumi, Katoh et al. "A Network Architecture for ATM–Based Connectionless Data Services", IEICE Transactions on Communications, JP, Institute of Electronics Information and Comm. Eng. Tokyo, vol. E76–B, No. 3, Mar. 1, 1993, pp. 237–247.

Saha D. et al. "A Design for Implementation of the Internet Protocol in a Local ATM Network", New Orleans Supercomm/ICC, Serving Humanity through Communications, 1994, vol. 3, pp. 1326–1333.

Bernd Kampmann et al., "APPN Architecture and Product Implementation Tutorial" IBM Red Book, May 1, 1991, pp. 43–71.

Plummer., "An Ethernet Address Resolution Protocol or Converting Network Protocol Addresses to 48. Bit Ehternet Address for Transmission on Ethernet Hardware" Network Working Group Request for Comments: 826 Nov. 1982.

M. Laubach, "Classical IP and ARP Over ATM" Hewlett–Packard Laboratories, Jan. 1994 Network Working Group Request for Comments: 1577 Category: Standard Tracks.

* cited by examiner

| PROTOCOL ADDRESS | ATM ADDRESS | REFERENCE TIME |
|---|---|---|
| B | b | 12:16 |
| A | a | 09:11 |
| C | c | 16:22 |
| D | d | 08:20 |
| ⋮ | ⋮ | ⋮ |
FIG. 3
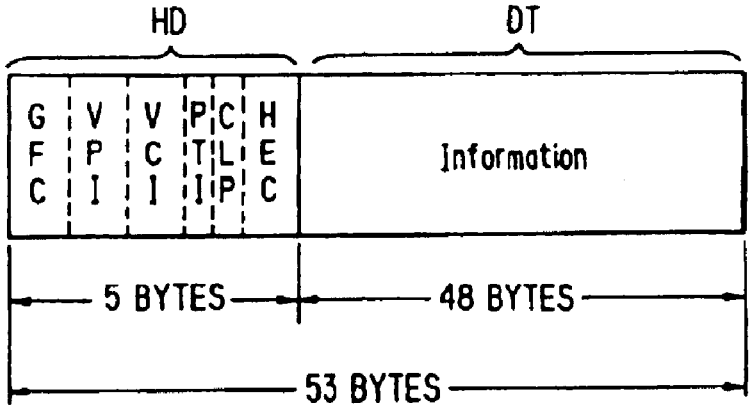
FIG. 4A
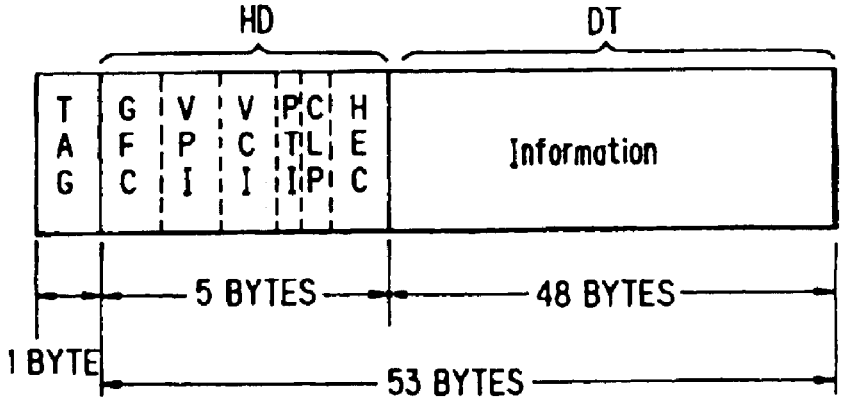
FIG. 4B

| TAG INFORMATION | | | | SELECTED OUTPUT | | | | |
|---|---|---|---|---|---|---|---|---|
| C | a1 | a2 | S | OUT-PUT 1 | OUT-PUT 2 | OUT-PUT 3 | OUT-PUT 4 | OUT-PUT 5 |
| 0 | 0 | 0 | 0 | ● | — | — | — | — |
| 0 | 0 | 1 | 0 | — | ● | — | — | — |
| 0 | 1 | 0 | 0 | — | — | ● | — | — |
| 0 | 1 | 1 | 0 | — | — | — | ● | — |
| 0 | x | x | 1 | — | — | — | — | ● |
| 1 | x | x | 0 | ● | ● | ● | ● | — |

SYSTEM FOR SERVER OBTAINING TERMINAL ADDRESS VIA SEARCHING ADDRESS TABLE OR VIA BROADCASTING TO ALL TERMINALS THROUGH EXCHANGE IN RESPONSE TO TERMINAL ADDRESS INTERROGATION REQUEST

Matter enclosed in heavy brackets [ ] appears in the original patent but forms no part of this reissue specification; matter printed in italics indicates the additions made by reissue.

BACKGROUND OF THE INVENTION

This invention relates to a communication system such as an ATM-LAN, a server and an address management method. More particularly, the invention relates to a communication system equipped with a plurality of terminals, a server having an ATM address table for storing the corresponding relationship between the protocol address and ATM address of each terminal, and an ATM exchange which accommodates each terminal and the server.

Improvements in the performance of personal computers and work stations have been accompanied by the rapid proliferation of applications for dealing with high-speed data and multimedia. In addition, such techniques as remote file access and decentralized computing have been established though use of LANS. For these reasons, there is expected to be greater demand for higher speed LANs for multimedia purposes.

In order to satisfy these expectations, there has been increased activity in the research and development of LANs (ATM-LANs) using ATM communication. An ATM-LAN is a switching LAN in which terminals are connected in a star-like configuration to an apparatus (an ATM exchange, for example) having an ATM switching function. Each terminal establishes a virtual channel (VC) directed toward a destination terminal and performs a data transmission by means of a fixed-length packet, referred to as an ATM cell, comprising a five-byte header and 48-byte data. As a result, it is possible to set a number of VCs on a terminal interface (where the number is capable of being expressed by the VPI/VCI) so that the terminal is capable of communicating with a plurality of other terminals simultaneously via the set VCs.

When communication is performed on a LAN, it is generally required that the originating terminal know the physical address of the terminal of the other party. In a conventional LAN, the physical address is a MAC address. Data in a LAN is transmitted in frame units, with each frame containing the addresses of the originating and terminating terminals. FIG. 21 is a diagram of a frame in a case where the protocol of a LAN is TCP/IP. The frame includes a start delimiter (SD) and an end delimiter (ED) between which are placed a destination address DA serving as a control field and a layer-2 address (MAC address), a sending address SA, an information field I (IP packet) and a frame scanning sequence FSC. The IP packet is subdivided into a control information field, a destination address DA' serving as a protocol address (IP address), a sending address SA' and an information field I'.

Communication with another terminal is not possible if the MAC address of the terminal is not known. If the MAC address of a party's terminal is unknown (but the protocol address is known), therefore, the original terminal determines the MAC address of the higher-order protocol address (IP address) by an address resolution protocol (ARP) and performs communication upon disassembling the higher-order packet (IP packet) into frames using the MAC address.

FIG. 22 is a processing flowchart of the ARP. If the MAC address of another party's terminal is unknown (NO at step S1), the originating terminal creates a frame (ARP frame) and sends the frame to the LAN (step S2). The ARP frame contains ① a broadcast address as the destination MAC address DA of the frame, ② a protocol address of another party's terminal serving as the destination protocol address DA', and ③ an indication that the frame is an ARP frame, this serving as control information CF'.

Upon receiving this ARP frame, each terminal determines whether the frame has its own address or is a broadcast frame. In this case, the frame is a broadcast frame and therefore the frame is accepted (step S11). Next, after verification of the fact that the frame is an ARP frame, each terminal determines whether the protocol address of the destination agrees with its own protocol address (step S12). Processing is terminated if the two addresses disagree. If the two addresses do agree, however, an answer frame which contains the terminals own MAC address is created at sent back to the originating terminal (step S13). Upon receiving the answer frame (YES at step S3), the originating terminal registers the correspondence between the MAC address of the other party's terminal contained in this answer frame and the protocol address in an internal IP-MAC address table (step S4) and then creates a frame (see FIG. 21) using the other party's MAC address and sends this frame to the LAN to perform LAN communication (step S5).

The foregoing is for the case of connection-less communication. In an ATM-LAN based upon connection-type communication, a VC is established between terminals and communication is performed while forming a higher-order packet into cells. In such an ATM-LAN, a physical address corresponds to the address (VPI/VCI) of the ATM layer, and this ATM layer address (VPI/VCI) is decided by a set-up sequence using the ATM address of the terminal. A set-up sequence is a call set-up processing sequence executed at the time of an outgoing call.

Thus, when the ATM address of the other party's terminal is unknown in an ATM-LAN, communication cannot be performed. This necessitates a method of analyzing the ATM address based upon the higher-order protocol address.

Conventional methods of acquiring the ATM address of another party's terminal include [a broadcast method of broadcasting an interrogation request to all terminals and a] server method of providing a server within the ATM-LAN and interrogating the server.

[FIG. 23 is a diagram for describing the broadcast method. Terminals 1a, 1b, 1c are connected to an ATM-LAN 2. According to the broadcast method, the ATM address interrogation request is broadcast within the network if the ATM address of the other party's terminal is unknown at the moment a communication request is generated, and a prescribed terminal responds to this interrogation by answering with its own ATM address. For example, if the ATM address of terminal 1b is unknown to the terminal 1a when this terminal communicates with the terminal 1b in FIG. 23, the terminal 1a broadcasts an ATM address interrogation request cell (which has the protocol address of terminal 1b) within the network. The terminal 1b, which is that terminal having a protocol address identical with that contained in the received cell, answers the terminal 1a with its own ATM address. The terminal 1a uses the received ATM address to call the terminal 1b and communicate with it.]

FIG. 24 is a diagram for describing the server method. FIG. 24 shows the terminals 1a, 1b, 1c and the ATM-LAN 2, which in this case is provided with a server 3. According to the server method, the corresponding relation between protocol addresses and ATM addresses of all terminals is registered in an ATM address table in advance. If the ATM address of another party's terminal is unknown at the moment a communication request is issued, an ATM address interrogation request is sent to the server and the server answers by retrieving the ATM address from the ATM address table. For example, if the ATM address of terminal 1c is unknown to the terminal 1a when this terminal communicates with the terminal 1c in FIG. 24, the terminal 1a sends the server 3 an ATM address interrogation cell (which has the protocol address of terminal 1c). The server 3 answers the terminal 1a by retrieving the ATM address of terminal 1c from the ATM address table, and the terminal 1a uses the received ATM address to call the terminal 1c and communicate with it.

[If the ATM address of another party's terminal is unknown at the moment a communication request is issued in the broadcast method, a broadcast is made within the network and the terminal is interrogated directly. Unlike the server method, implementation is easy because it is unnecessary to create a data base in advance. However, in cases where frequent communication is made with an unspecified terminal whose ATM address is unknown, broadcast of the interrogation request is made whenever a communication request is issued. A problem which arises as a consequence is an increase in control traffic. This problem becomes particularly pronounced with an increase in the number of terminals or depending upon the scale of the network.]

With the server method, on the other hand, there is no increase in traffic because there is no broadcast of an interrogation request. However, it is required that information (the correlation between protocol addresses and ATM addresses) regarding all terminals connected to the ATM-LAN be registered in the ATM address table in advance. At the time of initial installation therefore, it is necessary that the information regarding all terminals be registered in a data base (ATM address table) and that the data base be updated whenever a terminal is added on or moved. Further, an increase in the number of terminals or an increase in the scale of the network necessitates a data base of a larger capacity. This leads to an increase in the scale of the server hardware.

SUMMARY OF THE INVENTION

Accordingly, a first object of the present invention is to provide a communication system such as an ATM-LAN, a server and an address management method whereby the problems of the aforementioned methods are mitigated using the server method and broadcast method in combination.

A second object of the present invention is to provide a communication system such as an ATM-LAN, a server and an address management method in which an increase in traffic can be suppressed.

A third object of the present invention is to provide a communication system such as an ATM-LAN, a server and an address management method in which an initial setting or updating of an address table (data base) is not necessary at the time of initial installation or whenever a terminal is added on or moved.

A fourth object of the present invention is to provide a communication system such as an ATM-LAN, a server and an address management method in which a large-capacity data base is not required, thus making it possible to reduce the scale of server hardware.

In accordance with the present invention, the foregoing objects are attained by providing an address management method comprising a first step in which an originating terminal sends a terminal address interrogation request to a server if the terminal address of another party's terminal is unknown at the time of communication, a second step in which the server, upon receiving the terminal address interrogation request from the terminal, refers to an address table and searches for a terminal address corresponding to a protocol address contained in the interrogation request, a third step in which, if a terminal address corresponding to the protocol address is obtained from the address table, the server notifies the terminal of this terminal address, a fourth step in which, if the terminal address is not obtained from the address table, the server transfers the terminal address interrogation request containing the protocol address to all terminals via an exchange, a fifth step in which, when each terminal receives the terminal address interrogation request transferred from the server, the terminal determines whether the protocol address contained in the interrogation request agrees with its own protocol address and notifies the server of its own terminal address if agreement is achieved, and a sixth step in which the server notifies the originating terminal of the terminal address of which it has been notified.

Further, according to the present invention, the foregoing objects are attained by providing a communication system equipped with a plurality of terminals, a server having an address table for storing the corresponding relationship between a protocol address and terminal address of each terminal, and an exchange which accommodates each terminal and the server, wherein (1) each terminal includes means for sending a terminal address interrogation request to the server if the terminal address of another party's terminal is unknown at the time of communication, communication means for communicating with the other party's terminal via the exchange using a terminal address of which it has been notified by the server in response to the interrogation request, and terminal address answering means for answering the server with its own terminal address if a protocol address contained in a terminal address interrogation request transferred from the server agrees with its own protocol address, and (2) the server includes means for referring to the address table and searching for a terminal address corresponding to a protocol address contained in a terminal address interrogation request from a terminal, means which, if a terminal address corresponding to the protocol address has not been registered in the address table, is for transferring the terminal address interrogation request containing this protocol address to all terminals via the exchange, and means for notifying the terminal which has issued the interrogation request of a terminal address obtained from the address table or of a terminal address obtained by an answer from a terminal.

Furthermore, in accordance with the present invention, the foregoing objects are attained by providing a server comprising an address table for storing the corresponding relationship between a protocol address and terminal address of each of a plurality of terminals, search means for referring to the address table and searching for a terminal address corresponding to a protocol address contained in a terminal address interrogation request from a terminal, and interrogation means which, if a terminal address corresponding to the protocol address has not been registered in the address table, is for interrogating all terminals, via an exchange, for the terminal address corresponding to this protocol address, wherein in response to receipt of a terminal address interrogation request from an originating terminal, the search means refers to the terminal address table to obtain the terminal address conforming to the protocol address contained in this terminal address interrogation request and, if this terminal address has not been registered, the interrogation means interrogates all the terminal for terminal address.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a diagram showing an ATM address table according to the present invention;

FIGS. 4A, 4B, are diagrams showing the constitution of an ATM cell;

DESCRIPTION OF THE PREFERRED EMBODIMENTS (A) Overview of the invention

Figure 1:
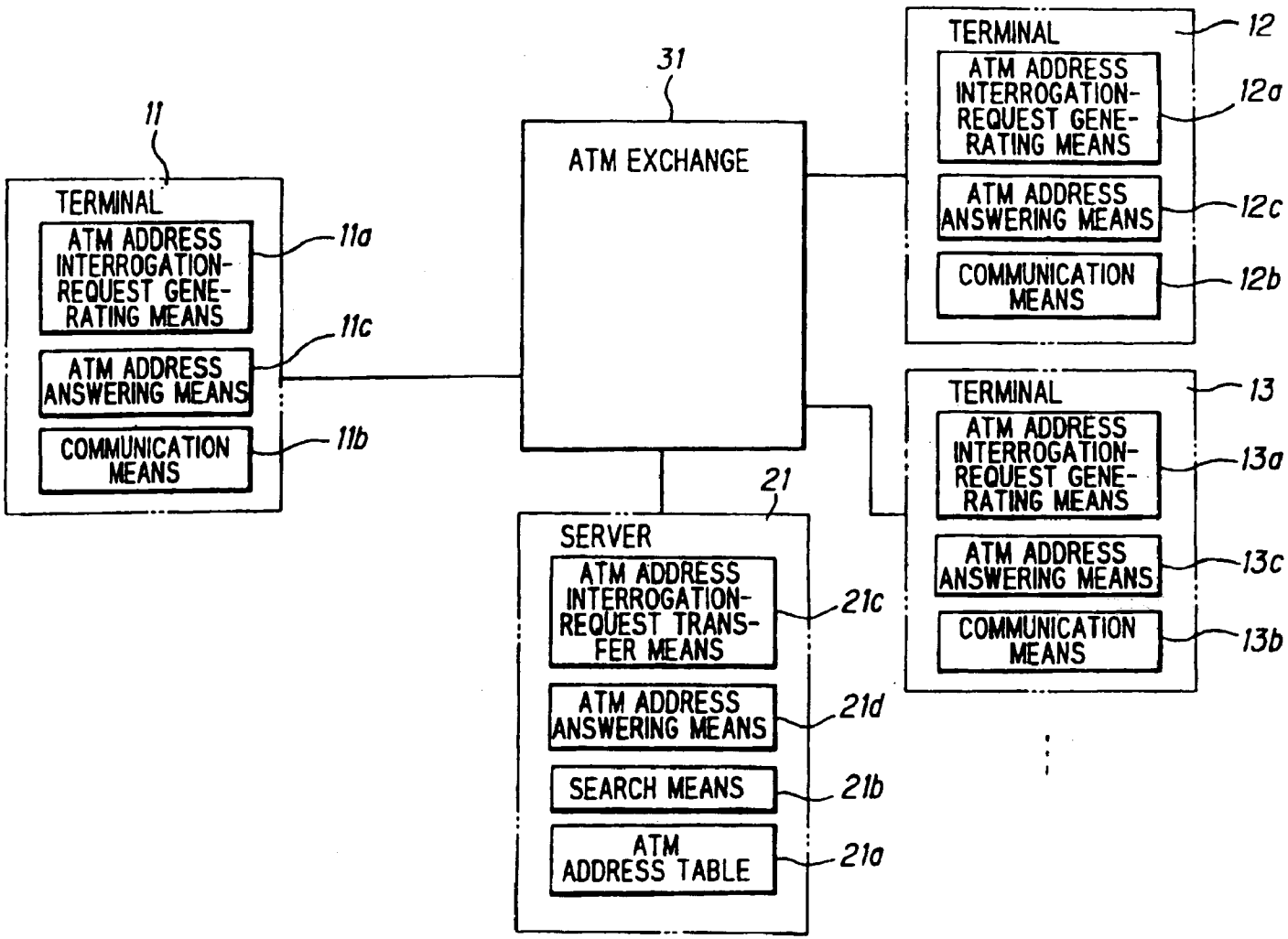
FIG. 1 is a block diagram for describing the principles of the present invention.

FIG. 1 is a diagram for describing the principles of the present invention.

As shown in FIG. 1, terminals 11, 12, 13, . . . are connected to a server 21. The terminals and the server are accommodated by an ATM exchange 31.

The terminals 11, 12, 13 have respective request generating means 11a, 12a, 13a for sending an ATM address interrogation request to the server 21 if the ATM address of another party's terminal is unknown at the time of communication; answering means 11b, 12b, 13b which communicate with the other party's terminal via the ATM exchange 31 using an ATM address of which it has been noted by the server in response to an ATM address interrogation request, and answering means 11c, 12c, 13c each of which answers the server with its own ATM address if a protocol address contained in an ATM address interrogation request transferred from the server 21 agrees with its own protocol address.

The server 21 includes an ATM address table 21a for storing, by use of a learning function, the corresponding relationship between the protocol address and ATM address of each terminal; search means 21b for referring to the ATM address table 21a and searching for an ATM address corresponding to a protocol address contained in an ATM address interrogation request from a terminal; broadcast means 21c which, if an ATM address for which it has been interrogated is not obtained from the ATM address table 21a, broadcasts an ATM address interrogation request to all terminals via the ATM exchange 31; and answering means for answering a terminal, which has issued the interrogation request, with the ATM address for which it has been interrogated.

The terminal 11, which is the originating terminal, sends an ATM address interrogation request to the server 21 if the ATM address of another party's terminal (terminal 12) is unknown at the time of communication. Upon receiving the ATM address interrogation request from the terminal 11, the server 21 refers to the ATM address table 21a and searches for an ATM address corresponding to the protocol address of the terminal 12 contained in the interrogation request. If an ATM address corresponding to the protocol address has been registered in the ATM address table 21a, the server 21 notifies the terminal 11 of this ATM address. If an ATM address corresponding to the protocol address has not been registered in the ATM address table 21a, however, the server 21 transfers the ATM address interrogation request containing the above-mentioned protocol address to all terminals 12, 13, . . . via the ATM exchange 31. When each terminal 12, 13, . . . receives the ATM address interrogation request transferred from the server 21, the terminal checks to see whether the protocol address contained in the interrogation request agrees with its own protocol address. Since the protocol address contained in the interrogation request agrees with its own protocol address, the terminal 12 notifies the server 21 of its own ATM address. The server 21 notifies the originating terminal 11 of the ATM address of which it has been notified. As a result, the originating terminal 11 communicates with the other party's terminal 12 via the ATM exchange 31 using the ATM address of which it has been notified by the server 21.

Thus, if an ATM address has been registered in the ATM address table of the server, the ATM address can be obtained through an operation similar to that of the conventional server method in response to the interrogation request for this ATM address. If the ATM address has not been registered in the ATM address table, the interrogation request for this ATM address is broadcast to enable the ATM address to be obtained. In other words, ATM addresses are managed by making joint use of the server method and broadcast method. This makes it possible to suppress an increase in the amount of control traffic. Moreover, ATM addresses can be perfected by successively registering corresponding relationships, which have been found using the broadcast method, in the ATM address table. In addition, it is possible to dispense with a task for initially setting the ATM address table and a task for updating the table when terminals are added on or moved.

Furthermore, if all terminals are divided up into a plurality of groups and a desired ATM address has not been registered in the ATM address table, the server transfers the ATM address interrogation request cell to all terminals of the first group. Monitoring is performed to determine whether a prescribed terminal has answered with the ATM address within a set period of time. If notification of the ATM address is not received within the set time period, the server transfers the interrogation request cell to all terminals of the next group. Thus, the server transfers the interrogation request cell while successively changing groups until the prescribed terminal answers with the ATM address. If this arrangement is adopted, there is a good possibility that the desired ATM address will be obtained before the interrogation request is sent to all terminals. As a result, any increase in traffic can be suppressed.

Further, upon receiving notification of the desired ATM address from the prescribed terminal, the server 21 registers the correspondence between the protocol address of this terminal and the ATM address of which it has been notified in the ATM address table 21a anew. Further, the server registers, in the ATM address table 21a, the corresponding relationship between the protocol address of the originating terminal, which address is contained in the ATM address interrogation request received from the originating terminal, and the ATM address. Accordingly, if an interrogation request for the above-mentioned ATM address is issued after registration, it is unnecessary to broadcast this interrogation request; the ATM address can be obtained in simple fashion from the ATM address table.

Furthermore, if the ATM address table 21a is full when the prescribed terminal has answered with the ATM address, the server 21 erases the oldest corresponding relationship referred to and newly registers the corresponding relationship between the protocol address of the terminal and the ATM address, of which it has been notified, in the ATM address table. If this arrangement is adopted, a large-capacity ATM address table (data base) will be unnecessary and the scale of the server hardware can be minimized. Further, by arranging is so that a terminal periodically sends an ATM address interrogation request for its own terminal to the server, the corresponding relationship between the terminal's own protocol address and the ATM address can be kept in the ATM address table at all times.

(B) ATM-LAN of the present invention (a) Overall configuration

Figure 2:
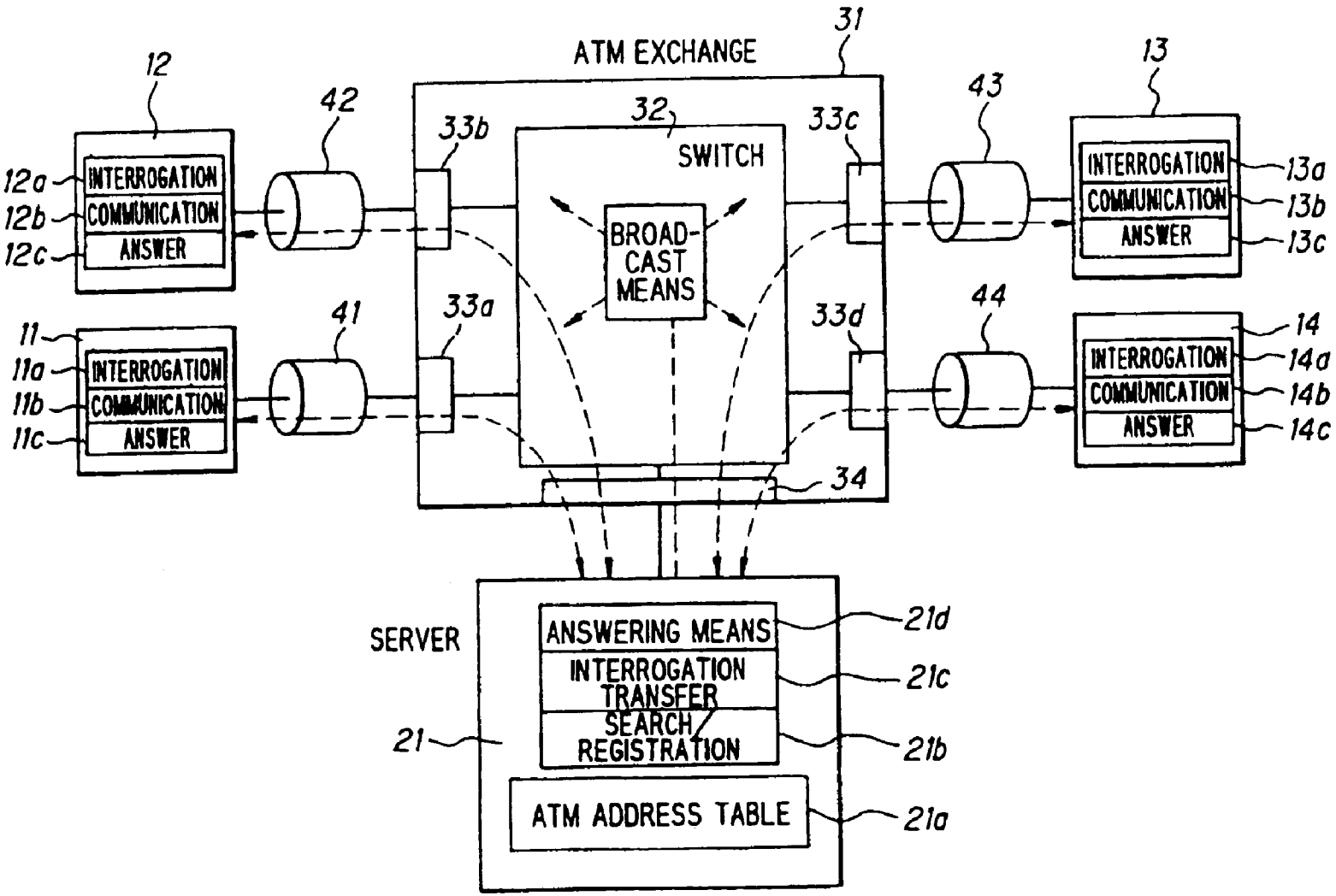
FIG. 2 is a diagram showing the configuration of an ATM-LAN according to the present invention.

FIG. 2 is a diagram showing the basic configuration of an ATM-LAN according to the present invention.

As shown in FIG. 2, the terminals 11~14 are connected to the server 21 by respective transmission lines 41~44 for ATM cells. The terminals and the server are accommodated by the ATM exchange 31.

The terminals 11, 12, 13, 14 have respective request generating means 11a, 12a, 13a, 14a for sending an ATM address interrogation request to the server 21 if the ATM address of another party's terminal is unknown at the time of a communication; answering means 11b, 12b, 13b, 14b which communicate with the other party's terminal via the ATM exchange 31 using an ATM address of which it has been notified by the server in response to an interrogation request; and answering means 11c, 12c, 13c, 14c each of which answers the server 21 with its own ATM address if a protocol address contained in an ATM address interrogation request transferred from the server 21 agrees with its own protocol address.

The server 21 includes the ATM address table 21a for storing the corresponding relationship between the protocol address and ATM address of each terminal; the search/registration means 21b which, when an ATM address interrogation request has been received from a terminal, retrieves the ATM address corresponding to the protocol address contained in this interrogation request from the ATM address table 21a and registers the new corresponding relationship in the ATM address table 21a; the broadcast means 21c which, if an ATM address for which it has been interrogated by a terminal is not obtained from the ATM address table 21a, transfers (broadcasts) an ATM address interrogation request to all terminals via the ATM exchange 31; and the answering means for answering a terminal, which has issued the above-mentioned interrogation request, with the ATM address for which it has been interrogated.

As illustrated in FIG. 3, the ATM address table 21a holds the corresponding relationship between the protocol address and ATM address of each terminal as well as the time at which reference was made to the corresponding relationship. If a terminal does not know the ATM address of another party's terminal at the time of communication, the terminal sends the server 21 an interrogation request for the ATM address. Upon receiving the ATM address interrogation request from the terminal, the search/registration means 21b of the server 21 checks to determine whether the ATM address corresponding to the protocol address contained in the request has been registered in the ATM address table 21a. If the ATM address has been registered in the ATM address table 21a, the search/registration means 21b updates the reference time and enters the ATM address into the answering means 21d. If the ATM address for which the server has been interrogated has not been registered kin the ATM address table 21a, then all terminals are interrogated to acquire the ATM address. In this case, the search/registration means 21b correlates the acquired ATM address and the reference time with the protocol address and stores this in the ATM address table 21a.

With reference again to FIG. 2, the ATM exchange 31 includes an ATM switch 32, terminal accommodating sections 33a~33d and a server accommodating section 34. The terminal accommodating sections 33a~33d add a tag (routing information) onto a cell entered from the respective terminal, replaces the VPI/VCI and sends the result to the ATM switch 32. Further, the terminal accommodating sections 33a~33d remove the tag from a cell entered from the ATM switch 32 and then sends the cell to the respective one of the transmission lines 41~44. The server accommodating section 34 adds a tag (routing information) onto a cell entered from the server 32, replaces the VPI/VCI and sends the result to the ATM switch 32. Further, the server accommodating section 34 removes the tag from a cell entered from the ATM switch 32 and then sends the cell to the server 21.

(b) ATM cell

As shown in FIG. 4A, an ATM cell is composed of a 53-byte, fixed-length block in which five bytes constitute a header HD and the remaining 48 bytes constitute an information field (payload) DT. The header HD contains a virtual channel identifier (VCI) for call identification so adapted that a destination can be ascertained even after data is broken down into blocks; a virtual path identifier (VPI) for specifying a path; a generic flow control (GFC) used to control flow between links; payload type (PTI); a cell loss priority (CLP) and a header error control (HEC), which is a code for header error revision. Before this ATM cell is fed into the ATM switch 32, the terminal accommodating sections 33a~33d add on a one-byte routing tag TAG and update the VPI/VCI, as shown in FIG. 4B.

(c) Operation when ATM address of other party's terminal is already known

Assume by way of example that an operation is performed in which terminal (originating terminal) 11 calls terminal (terminating terminal) 13. (This is an operation for entering the ATM address of the terminating terminal 13.) A cell assembler within the originating terminal divides a set-up message (data which includes the ATM address of the original terminal and the ATM address of the terminating terminal, etc.) into cell units, adds a signaling VCI onto each item of divided data to generate a signal cell and sends the signal cell to the ATM exchange 31. If a signal device (not shown) in the ATM exchange 31 receives the signal cell, the device assembles the information contained in the signal cell and sends the information to a CPU (not shown). On the basis of the received message, the CPU performs call processing control, decides the VPI/VCI and assigns a prescribed VCI to the originating terminal and terminating terminal.

The CPU of the ATM exchange 31 correlates the VCI of the originating terminal 11 with a routing table within the terminal accommodating section 33a and registers information (tag information) specifying the outgoing line of the cell having this VIC as well as a VPI/VCI for replacement.

When a path is formed between the originating terminal 11 and terminating terminal 13, the originating terminal 11 disassembles the data to be transmitted into prescribed byte lengths, creates a cell upon adding on a header containing the assigned VCI mentioned above and sends the cell to the ATM exchange 31. When the cell enters from the terminal 11 via a prescribed incoming highway (in-line) 41, the terminal accommodating section 33a of the ATM exchange 31 adds on the tag information TAG (see FIG. 4B) upon referring to the routing table and sends the result to the ATM switch 32 upon replacing the VPI/VCI. On the basis of the tag, the ATM switch 32 sends the ATM cell to a prescribed outgoing highway (out-line) 43. As a result, the cell outputted by the original terminal 11 arrives at and is accepted by the terminating terminal 13 via the path decided by call control.

Thereafter, the originating terminal 11 sends the cell to the terminating terminal 13 in successive fashion. The terminating terminal 13 assembles the information field DT contained in the received cell and restores the original data.

(d) Tag information

Figures 5, 6:
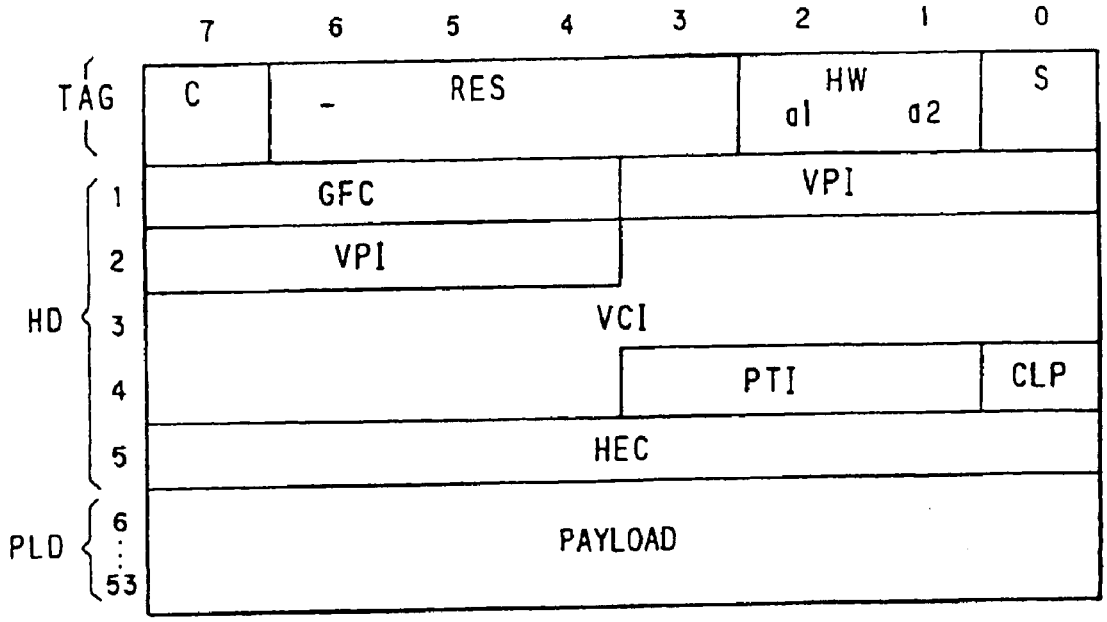
FIG. 5 is a diagram showing the detailed constitution of an ATM cell to which a tag has been added.
FIG. 6 is a table for describing the relationship between tag information and outgoing lines.

FIG. 5 is a diagram showing the detailed composition of the ATM cell to which the tag TAG has been added. TAG represents one-byte tag information, HD a first-byte header and PLD a 48-byte payload. The header HD contains the virtual path identifier VPI, the virtual channel identifier VCI, the generic flow control GFC used in flow control between links, a payload type PTI, the cell loss priority CLP and the header error code HEC.

The tag includes a copy designating bit C (in which "0" indicates one-to-one communication and "1" represents broadcast communication), an inter-switch path selection HW (a1, a2) (in case of a 4×4 ATM switch), and a reserve bit RES for when the switch is enlarged in scale.

FIG. 6 is a table for describing the relationship between the tag information and outgoing path. The path of the entered ATM cell is decided by the four bits C, a1, a2 and S. In FIG. 6, "x" signifies "don't care" (i.e., the bit may be "0" or "1"), and the black circles indicate output to an outgoing path.

Further, C=1, S=0 signifies broadcast, with the ATM switch 32 outputting the input cell to outgoing paths of all terminals with the exception of the server. C=0, S=1 signifies output solely to the server, with the ATM switch 32 outputting the input cell solely to the server. C=0, S=0 signifies output of the cell to an outgoing path that conforms to the combination of a1 and a2, with the ATM switch 32 outputting the input cell to the prescribed outgoing path that conforms to the combination of a1 and a2.

(e) ATM switch

Figure 7:
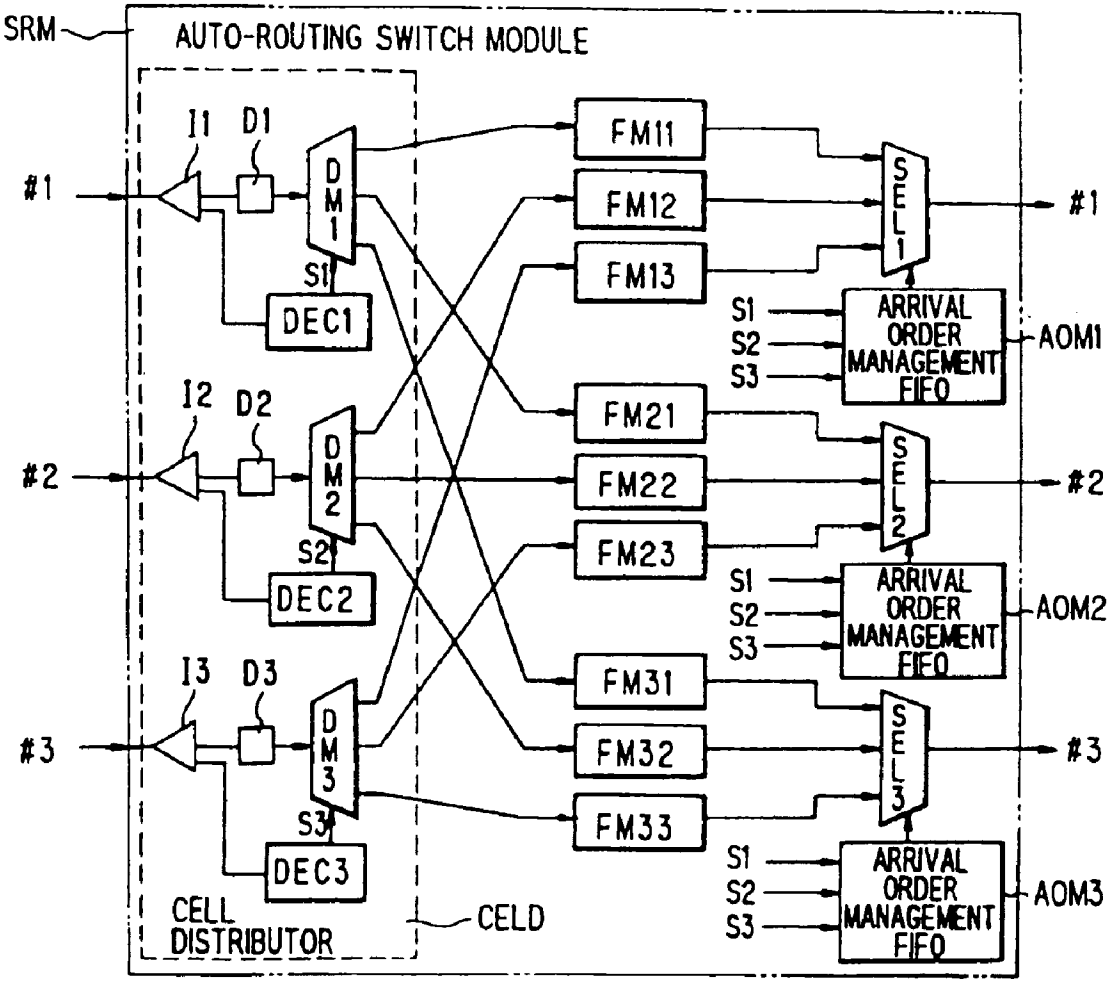
FIG. 7 is a diagram for describing an ATM switch.

FIG. 7 is a diagram showing the construction of an n×n (n=3) ATM switch. The ATM switch includes tag information detection circuits $I_1$~$I_3$, transmission information delay circuits $D_1$~$D_3$, demultiplexers $DM_1$~$DM_3$, tag information decoding circuits $DEC_1$~$DEC_3$, which construct a cell distribution unit CELD, buffer memories such as FIFO (first-in, first-out) memories $FM_{11}$~$FM_{33}$, selectors $SEL_1$~$SEL_3$, and arrival order management FIFOs $AOM_1$~$AOM_3$. Each arrival order management FIFO ($AOM_1$~$AOM_3$) is connected to the output terminals of the information decoding circuits $DEC_1$~$DEC_3$ and stores the order in which cells arrive at the corresponding three buffer memories $FM_{11}$~$FM_{13}$, $FM_{21}$~$FM_{23}$, $FM_{31}$~$FM_{33}$. These FIFOs control the corresponding selectors $SEL_1$~$SEL_3$ so that cells are read out of the three buffer memories in the order of cell arrival and sent to outgoing lines #1~#3.

Cells that enter input terminals #1~#3 have the format shown in FIG. 5. Detection lines $I_i$ (i=1~3) extract the tag information TAG contained in the input signal and send the information to the decoder circuits $D_i$ (i=1~3). If the entering tag information TAG indicates the output terminal #j (j=1~3), the decoder circuit $DEC_i$ operates the demultiplexer $DM_i$ by a changeover signal $S_i$ to send the cell to the FIFO memory $FM_{ji}$. For example, if the tag information TAG contained in the cell which has entered from the input terminal #1 indicates the output terminal #2, the decoder circuit $DEC_1$ operates the demultiplexer $DM_1$ so that the information from the input terminal #1 enters $FM_{21}$. The arrival order management FIFO ($AOM_i$) is connected to the output terminals of the tag information decoding circuits $DEC_1$~$DEC_3$ and stores the order in which cells arrive at the corresponding three buffer memories $FM_{i1}$~$FM_{i3}$. For example, if cells arrive in the order of buffer memory $FM_{11}$→$FM_{12}$→$FM_{13}$→$FM_{12}$→. . . , buffer memory identification codes are stored in the arrival order management FIFO ($AOM_1$) in the order of cell arrival, i.e., in the manner 1→2→3→2→. . . . Thereafter, the arrival order management FIFO ($AOM_1$) controls the corresponding selector $SEL_i$ so that cells are read out of the three buffer memories $FM_{i1}$~$FM_{i3}$ in the order of cell arrival and sent to the outgoing line #i.

A buffer function is thus obtained by providing the FIFO memory $FM_{ij}$ with a capacity equivalent to a plurality of cells. This makes it possible to deal satisfactorily with a case in which there is a temporary increase in transmission data. Further, since cells are read out of the buffer memories $FM_{i1}$~$FM_{i3}$ in the order of cell arrival, equal numbers of cells reside in the buffer memories $FM_{i1}$~$FM_{i3}$. This is helpful in avoiding situations in which cells are discarded owing to overflow of the buffer memories.

In FIG. 7, an ATM switch for which n=3 holds is illustrated for the sake of explanation. However, an ATM switch in which n=5 holds can be readily implemented through a similar arrangement. In such case, tag information decoding circuits $DEC_1$~$DEC_5$ would perform the decoding processing shown in FIG. 6, the input cells would be stored in FIFO buffers $FM_{ij}$ conforming to the prescribed outgoing lines (outputs 1~5) and the cells would be stored in the arrival order management FIFOs in the order of arrival.

Figure 8:
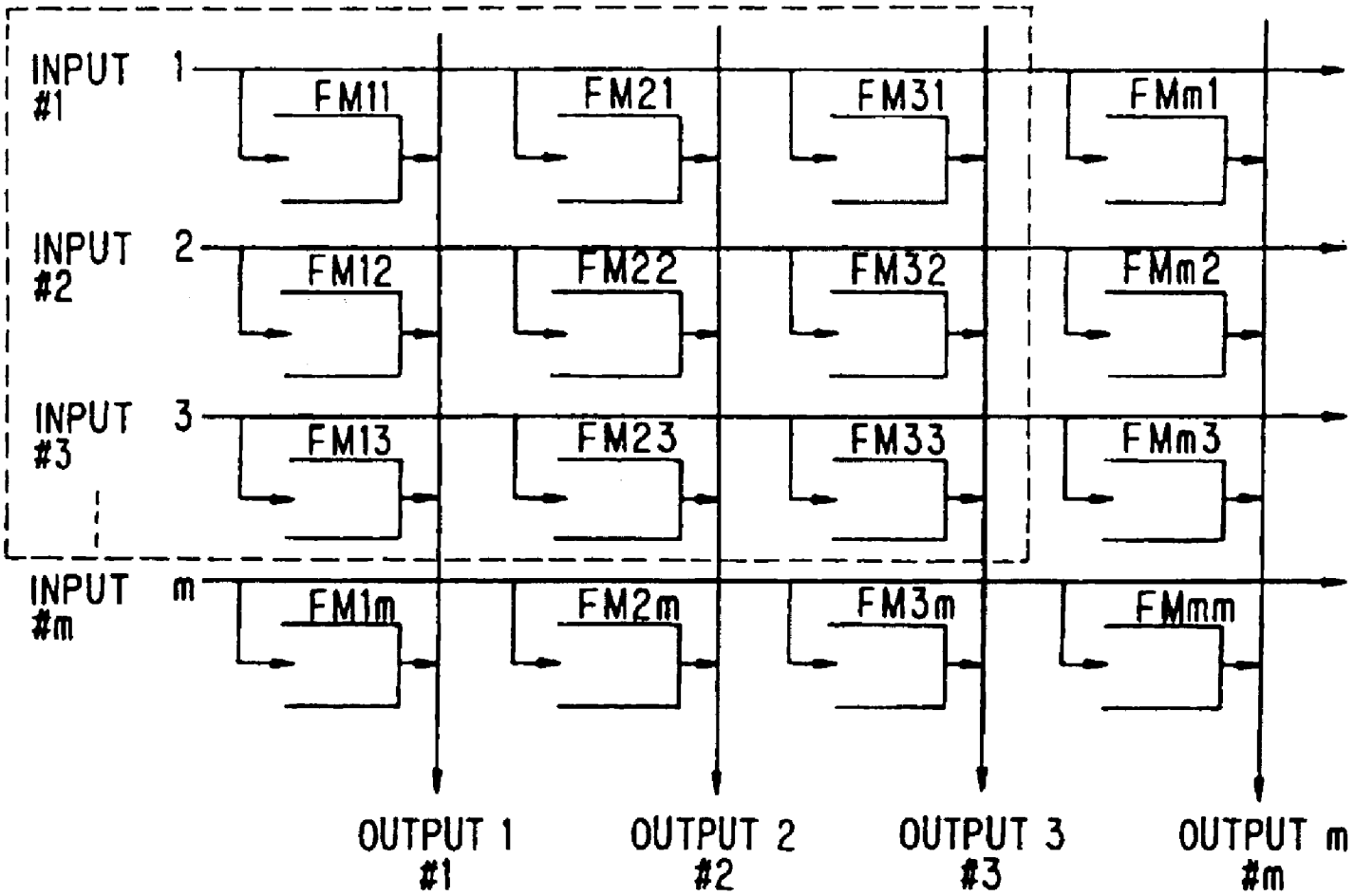
FIG. 8 is diagram showing a simplified representation of the ATM switch.

FIG. 8 is diagram showing a simplified representation of the ATM switch. Buffer memories $FM_{11}$~$FM_{mm}$ are placed at the intersections between m-number of input links and m-number of output links. The ATM switch of FIG. 7 corresponds to the portion surrounded by the dashed line.

(f) Broadcast from server

In a case where an ATM address of another party's terminal requested by a certain terminal has not been registered in the ATM address table 21a, the server 21 transfers (broadcasts) an interrogation request cell for the ATM address to all terminals via the ATM exchange 31.

Figure 9:
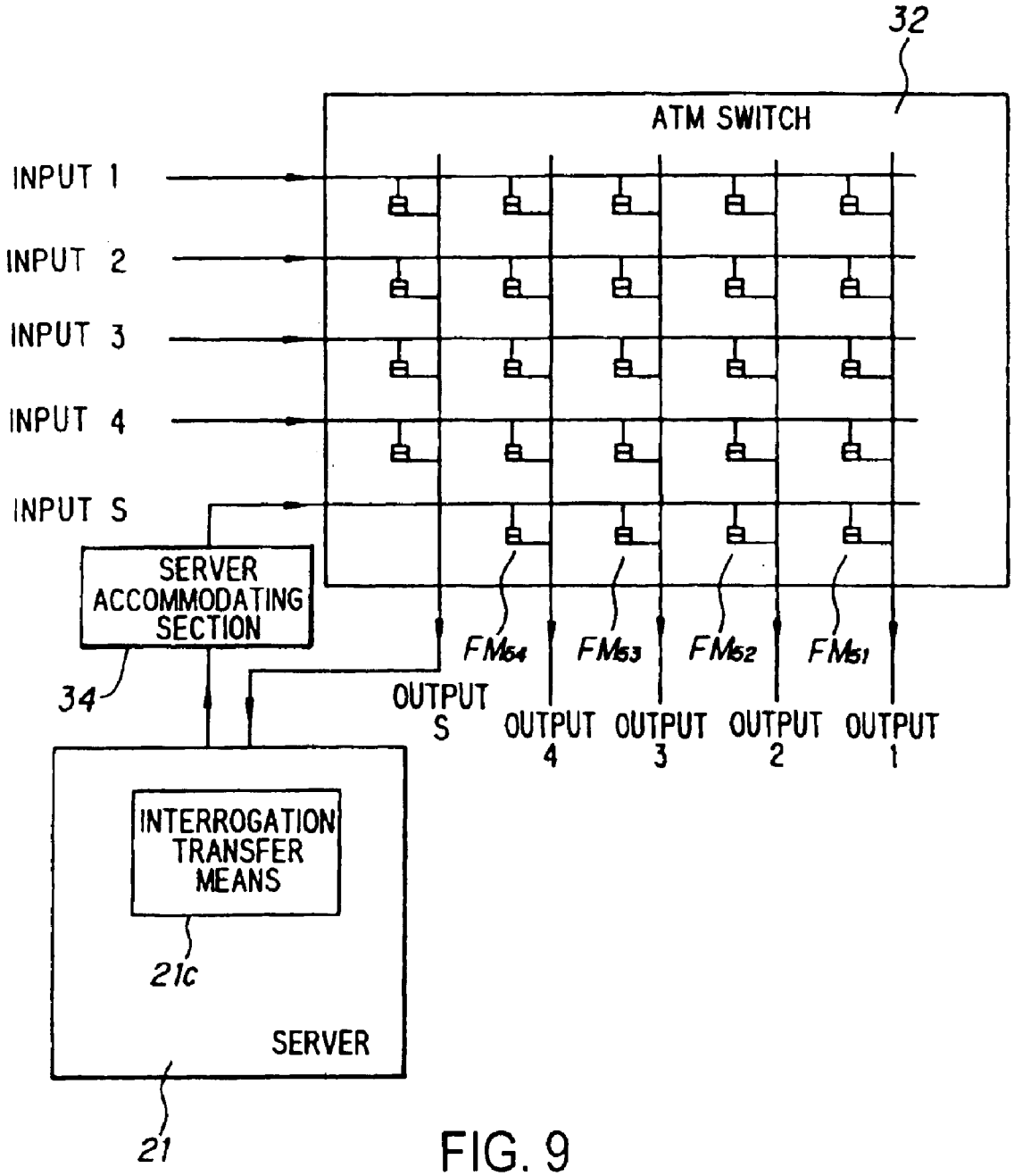
FIG. 9 is a diagram for describing broadcast of an ATM-[ARM] *ARP* request.

FIG. 9 is a diagram for describing the broadcast method. The value of the VPI/VCI of the broadcast cell outputted by the server 21 is decided on as being a fixed value (=FF–FFFF) beforehand.

The broadcast means 21c of server 21 enters an ATM cell into ATM exchange 31, the ATM cell having ① FF–FFFF as VPI/VCI, ② a protocol address of the output party's terminal as data and ③ data to the effect that the cell is an interrogation for the ATM address.

In a case where VPI/VCI=FF–FFFF holds, the server accommodate section 34 of the ATM exchange 31 adds tag information TAG (C=1, S=0) onto the input cell and enters the cell into the ATM switch 32. As a result, the ATM switch 32 outputs the ATM cell to the outgoing lines (outputs 1~4) of all terminals via the buffers $FM_{51}$~$FM_{54}$ and transfers the cell to all terminals.

In summary, the server 21 and all terminals 11~14 are interconnected beforehand in the ATM exchange 31 by PVCs (permanent virtual channels) having identical values. When an interrogation request cell having the above-mentioned PVC has entered from the server 21, a cell copy is made in the ATM exchange 31 and the interrogation request cell is transferred to all terminals 11~14.

More specifically, when the VPI/VCI of the broadcast cell is FF–FFFF and the cell for which VPI/VCI=FF–FFFF holds has entered from the server 21, the server accommodating section 34 adds on the tag information TAG so that the cell will be entered into all terminals and transfers the tag to the ATM switch 32. On the basis of the tag information TAG, the ATM switch 322 broadcasts the input cell to all terminals.

It should be noted that all terminals 11~14 are divided up into a plurality of groups in advance, the server 21 transfers an interrogation request cell to all terminals of the first group and performs monitoring to determine whether a prescribed terminal has answered with the ATM address within a set period of time. If notification of the ATM address is not received within the set time period, the server transfers the interrogation request cell to all terminals of the next group. Thus, the server transfers the interrogation request cell group by group while successively changing the group until the prescribed terminal answers with the ATM address.

(g) Control for sending/receiving ATM-ARP message

Control for sending and receiving an ATM-ARP message (an ATM address interrogation message/ATM address answer message) is performed in the manner set for the below, (g-1) A control connection is set beforehand through the following steps ①–③:

① The VPI/VCI of the cell for the ATM-ARP message on each of the terminal lines 41~44 is made FF–FFFF. More specifically, the VPI/VCIs of the ATM address interrogation cells sent from the terminals 11~14 to the server 21 are FF–FFFF.

② VPI/VCIs are assigned to terminals in regular order on the server side. That is, the VPI/VCIs of the cells for the ATM-ARP messages sent from the server to the terminals 11~14 are made as follows, respectively:

00-0001, 00-0002, 00-0003, 00-0004.

③ In order to broadcast the ATM address interrogation cell to all terminals, the VPI/VCI of the cell is made FF–FFFF on the server side. This is in addition to ② above.

Figure 10:
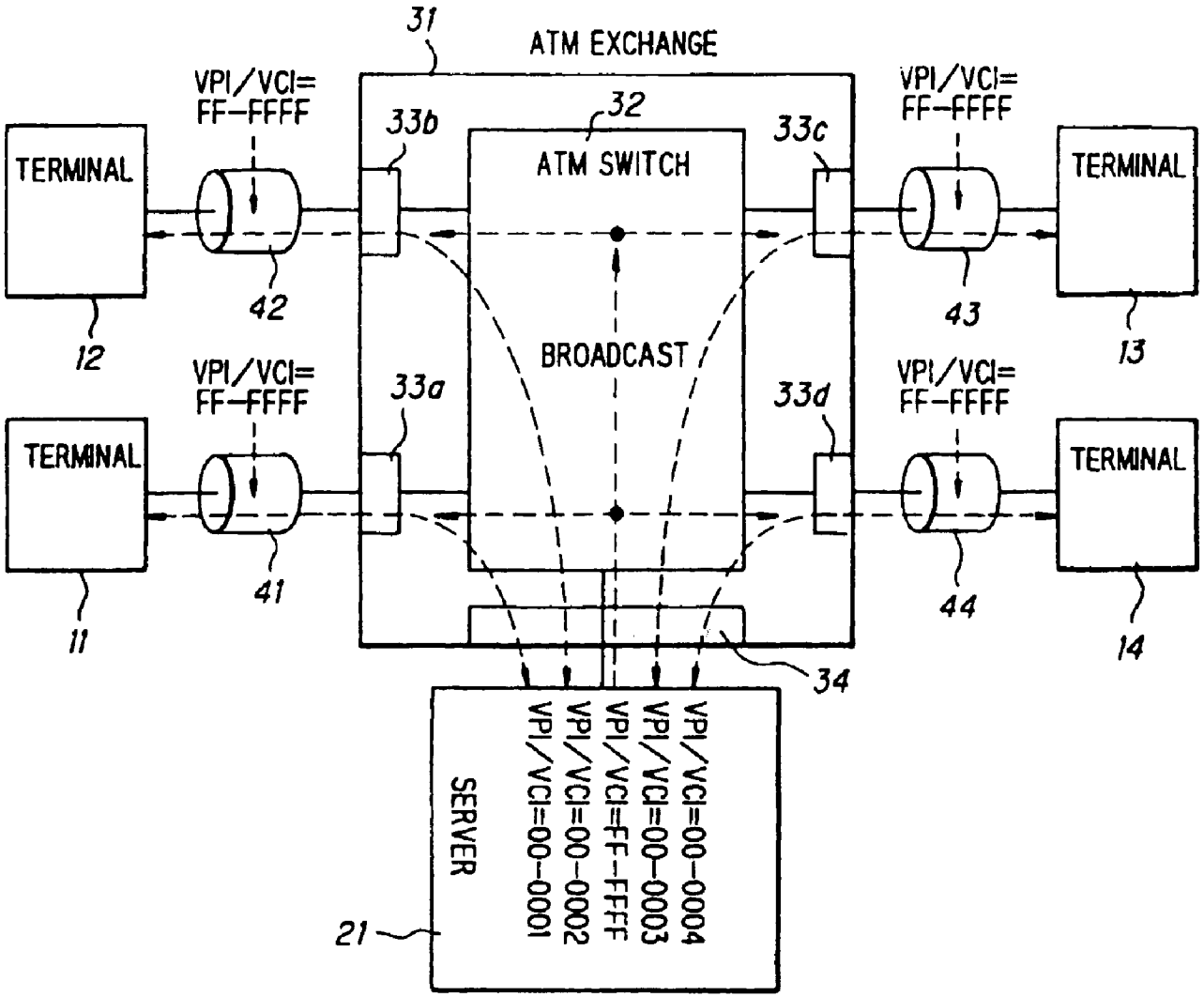
FIG. 10 is a diagram useful in describing control of sending receiving of an ATM-ARP message.

FIG. 10 is an explanatory view showing connections between the server 21 and terminals 11~14 in a case where control connections are set in the manner described above.

(g-2) General features of communication method

When cells (ATM address interrogation cells) for which VPI/VCI=FF–FFFF holds enter from the terminals 11~14, the terminal accommodating sections 33a~33d replace the VPI/VCIs with 00-0001~00-0004, add the tag information TAG (C=0, S=1), onto the cells and then transfer the cells to the ATM switch 32.

On the basis of the tag information TAG (C=0, S=1), the ATM switch 32 transfers the input cells (ATM address interrogation cells) to the server 21.

If an ATM address interrogation cell is received, the server 21 obtains the ATM address and notifies the terminal that issued the interrogation cell. It should be noted that the server 21 can identify from which terminal a cell has arrived depending upon the VPI/VCI (=00-0001, ~00-0004) updated by the terminal accommodation sections 33a~33d.

The answer cells of the ATM addresses from the server 21 to the terminals 11~14 have VPI/VCIs (=00-0001~00-0004) conforming to the terminals which are the destination of transmission. When the answer cell enters, the server accommodation section 34 updates the value of the VPI/VCI from 00-0001~00-0004 to FF–FFFF, adds on the tag information TAG (S=0, C=0, a1, a2=destination terminals) and transfers the cell to the ATM switch 32. On the basis of the tag information TAG, the ATM switch 32 switches the input cell, sends the cell to the line to which the prescribed terminal is connected and enters the cell into this terminal.

In the case of a broadcast, on the other hand, the interrogation request cell sent from the server 21 has FF–FFFF as the VPI/VCI. When the interrogation cell for which VPI/VCI=FF–FFFF holds enters, the server accommodating section 34 adds on the tag information TAG (C=1, S=0) specifying all paths and then transfers the cell to the ATM switch 32. In this case, the value of the VPI/VCI is not changed. On the basis of the tag information TAG (C=1, S=0), the ATM switch 32 switches to all paths and enters the cell into all terminals.

(h) Communication sequence of the invention

*A broadcast method of broadcasting an interrogation request to all terminal:*

Figure 23:
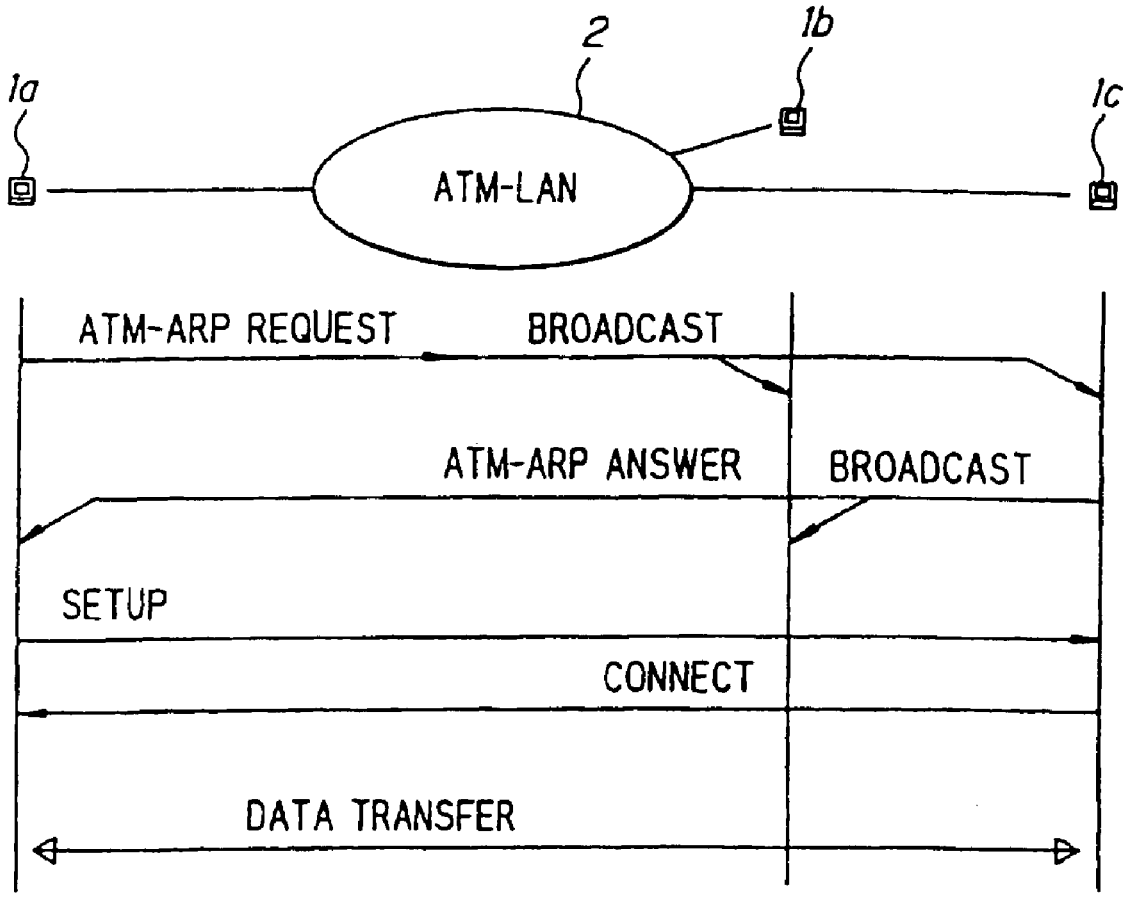
FIG. 23 is a diagram (according to the broadcast method) for describing conventional ARP processing in an ATM-LAN.
Figure 24:
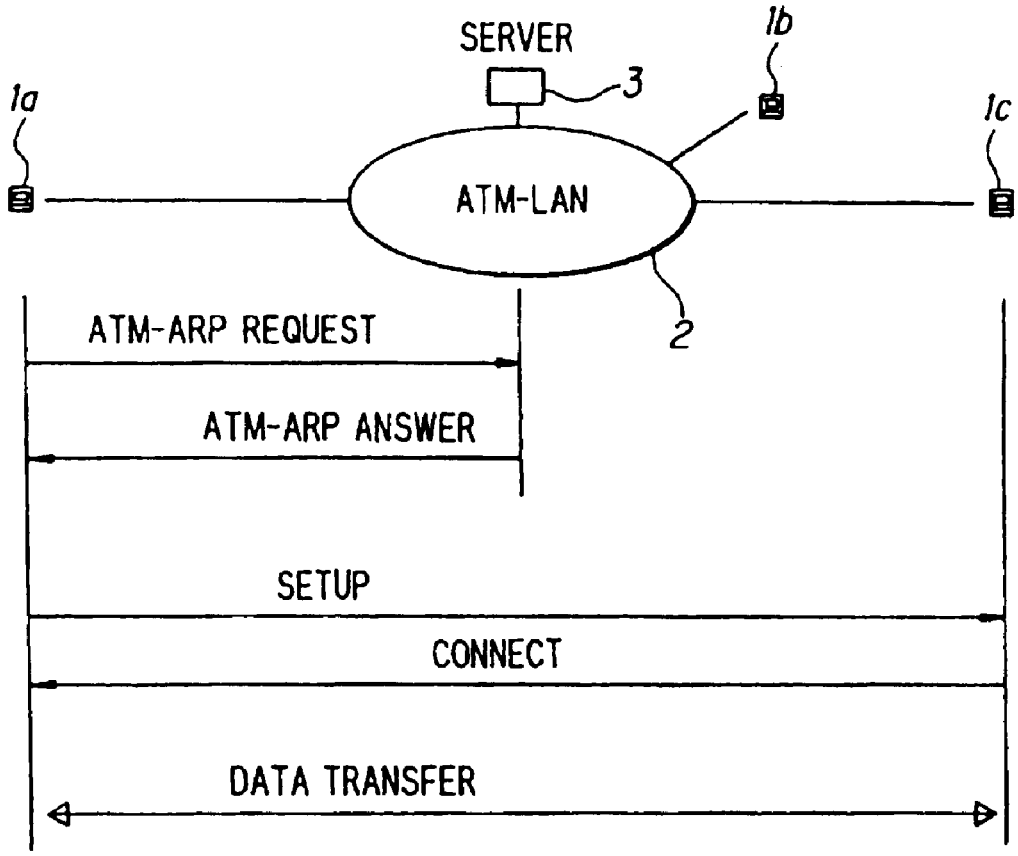
FIG. 24 PRIOR ART
FIG. 24 is a diagram (according to the server method) for describing conventional ARP processing in an ATM-LAN.

*FIG. 23 is a diagram for describing the broadcast method. Terminals 1a, 1b, 1c are connected to an ATM-LAN 2. According to the broadcast method, the ATM address is interrogation request is broadcast within the network if the ATM address of the other party's terminal is unknown at the moment a communication request is generated, and a pre-*

*scribed terminal responds to this interrogation by answering with its own ATM address. For example, if the ATM address of terminal 1b is unknown to the terminal 1a when this terminal communicates with the terminal 1b in FIG. 23, the terminal 1a broadcasts an ATM address interrogation request cell (which has the protocol address of terminal 1b) within the network. The terminal 1b, which is that terminal having a protocol address identical with that contained in the received cell, answers the terminal 1a with its own ATM address. The terminal 1a uses the received ATM address to call the terminal 1b and communicate with it.*

*If the ATM address of another party's terminal is unknown at the moment a communication request is issued in the broadcast method, a broadcast is made within the network and the terminal is interrogated directly. Unlike the server method, implementation is easy because it is unnecessary to create a data base in advance. However, in cases where frequent communication is made with an unspecified terminal whose ATM address is unknown, broadcast of the interrogation request is made whenever a communication request is issued. A problem which arises as a consequence is an increase in control traffic. This problem becomes particularly pronounced with an increase in the number of terminals or depending upon the scale of the network.*

Figure 11:
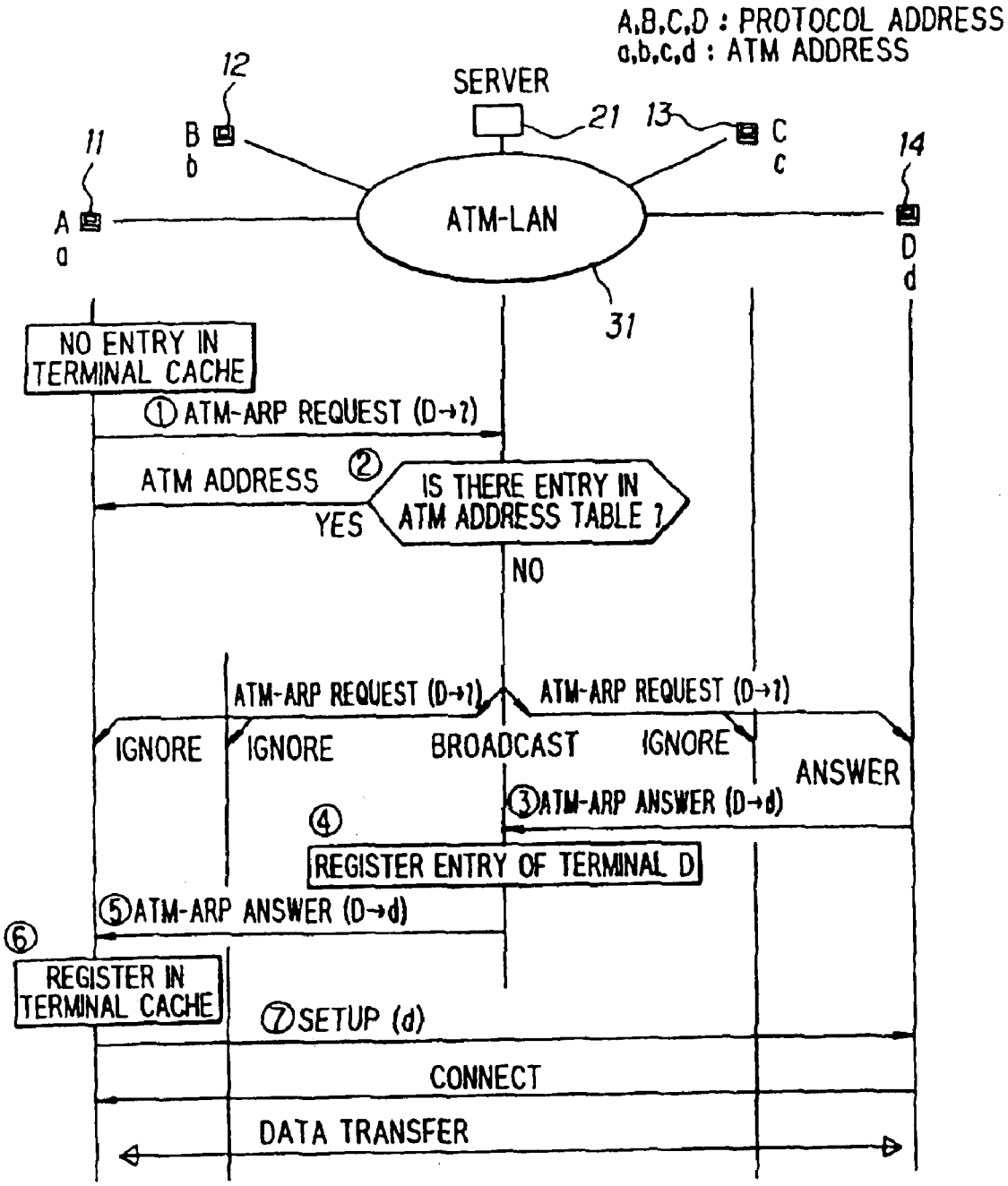
FIG. 11 is a diagram (part 1) for describing a communication sequence according to the present invention.

FIG. 11 is a diagram for describing the communication sequence of the present invention.

Figure 12:
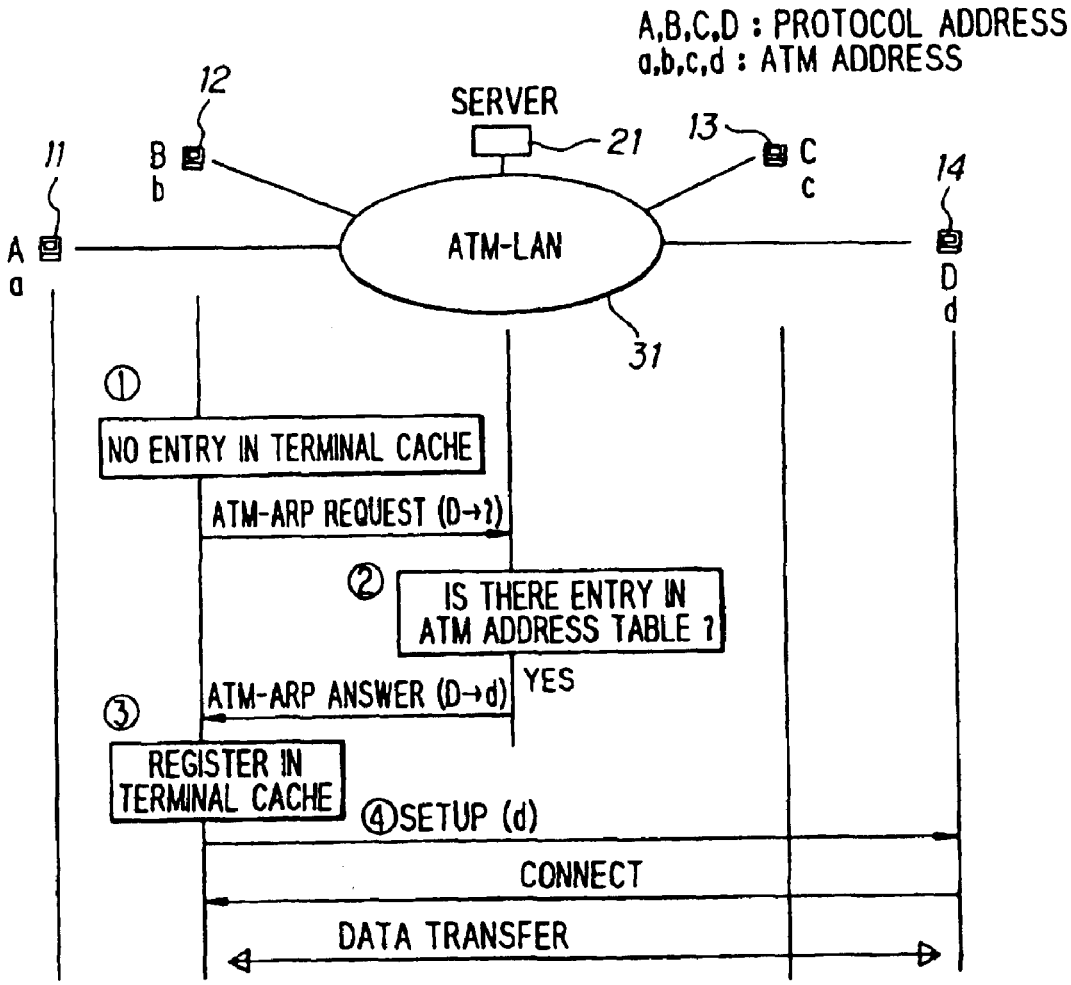
FIG. 12 is a diagram for describing the format of the ATM-ARP message.

① The originating terminal 11 refers to its own cache memory and determines whether the ATM address of the other party has been registered. It should be noted that information regarding a party to be communicated with will not have been registered in the cache memory when power is introduced to the system. If the information has been registered, set-up is executed to set a path using this ATM address and communication is carried out. If the information has not been registered, however, the originating terminal 11 puts an ATM-ARP request (an ATM address interrogation request) message into the form of a cell and sends the cell to the server 21 in order to inquire as to the ASTM address of the communicating party 14. FIG. 12 illustrates the format of the ATM-ARP request message/answer message.

The message includes protocol type 100, which indicates the type (IP, etc.) of host protocol; ATM address length 101, which indicates address length of the ATM address used in an ATM network; protocol address length 102, which indicates address length (four bytes in case of protocol type IP) of the host protocol; an operation code ("1": request, "2": answer) 103; ATM address (source address) 104 of the requesting terminal; a protocol address (source address) 105 of the requesting terminal; ATM address 106 of the target terminal, which is all "1's" or all "0's" in case of a request message; with the ATM address being inserted in case of the answer message; and protocol address 107 of the target terminal.

② Upon receiving the ATM-ARP request from the terminal 11, the server 21 determines whether the ATM address corresponding to the protocol address of the target terminal contained in the request has been registered in the ATM address table 21a. If the ATM address has been registered, an ATM-ARP answer message containing this information (ATM address) is formed into a cell and sent back to the terminal 11.

If the ATM address has not bene registered, the server 21 transfers the ATM-ARP request to all terminals using the broadcast function of the ATM switch 32.

③ Upon receiving the ATM-ARP request transferred (broadcast) from the server 21, each of the terminals 11~14 determines whether the protocol address of the target terminal contained in this request agrees with its own protocol address. If agreement is achieved, the terminal forms the ATM-ARP answer message indicating its own ATM address into a cell and sends the message back to the server 21.

④ Upon receiving the ATM-ARP message from the terminal 14, the server 21 obtains the ATM address of the target terminal 14. The search/registration means 21b correlates the ATM address d and the reference time with the protocol address D of the target terminal 14 and registers the correlation in the ATM address table 21a, as shown in FIG. 3. If the ATM address table 21a is saturated (full), the entry having the oldest reference time is deleted and the a new entry is registered. It should be noted that an arrangement can be adopted in which, rather than storing the reference time, correlation are stored in order starting from the oldest correlations by the LRU (least recently used) method.

⑤ Further, when the ATM-ARP answer message is received from the terminal 14, the server 21 transfers the ATM address contained in the answer message to the requesting terminal 11 that transmitted the ATM-ARP request message.

⑥ Upon receiving the ATM-ARP answer message at ② or ⑤, the terminal 11 that issued the ATM-ARP request message at ① above recognizes the ATM address of the communicating party 14, correlates this ATM address with the protocol address and saves the correlation in its own cache memory.

⑦ Further, the terminal 11 executes set-up using the ATM address of the communicating party, establishes a path and communicates with the terminal 14.

Thus, in a case where the ATM address has been registered in the ATM address table 21a, the server 21 operates in the same manner as in the conventional server method. If the ATM address has not been registered in the ATM address table 21a, however, the server 21 can obtain the target ATM address by broadcast of the ATM-ARP request message. Accordingly, the server need not register the information of all terminals in the ATM address table 21a in advance, and the stored content of the ATM address table can be perfected by a learning function. This is effective in terms of implementing the ATM address table by small-scale circuitry.

Figure 13:
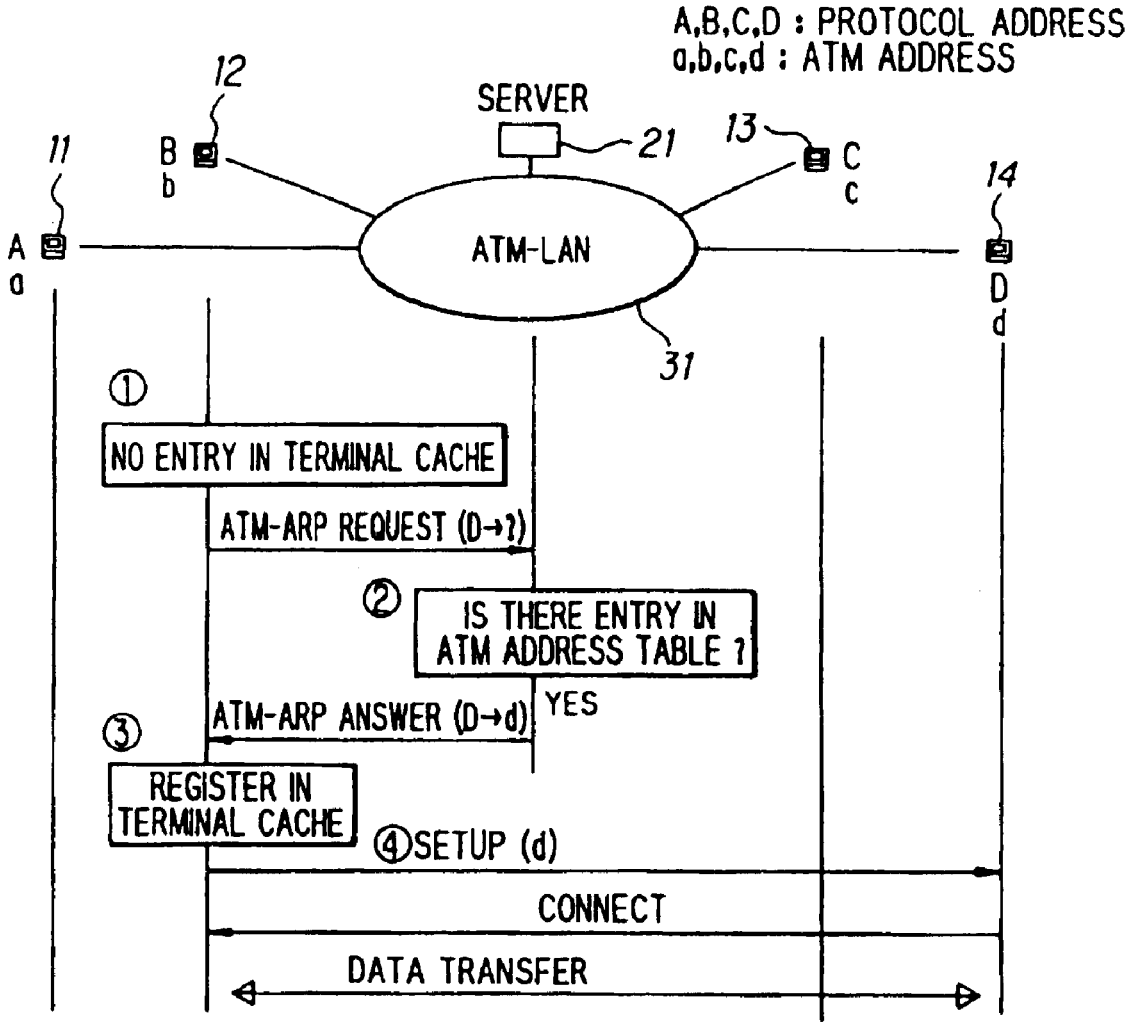
FIG. 13 is a diagram (part 2) for describing the communication sequence according to the present invention.

FIG. 13 is a diagram for describing another communication sequence of the present invention. This is for a case in which an ATM address for which an inquiry has been made by the ATM-ARP request from a certain terminal has been registered in the ATM address table 21a. Specifically, this is an example of a case in which the terminal 12 communicates with the terminal 14 after the communication sequence of FIG. 11.

① The terminal 12 that has issued the communication request refers to its own cache memory and determines whether the ATM address of the communicating party has been registered. If the ATM address has not been registered, set-up is executed to set a path using this ATM address and communication is carried out. If the information has not been registered, however, the terminal 12 puts the ATM-ARP request message into the form of a cell and sends the message to the server 21 in order to inquire as to the ATM address corresponding to the protocol address of the communicating party 14.

② Upon receiving the ATM-ARP request from the terminal 12, the server 21 determines whether the ATM address corresponding to the protocol address of the terminal 14 contained in the request has been registered in the ATM address table 21a. If the ATM address has been registered, an ATM-ARP answer message containing this information (ATM address) is formed into a cell and is sent back to the terminal 12.

③ Upon receiving the ATM-ARP request from the server 21, the terminal 12 recognizes the ATM address of the communicating party 14, correlates this ATM address with the protocol address and saves the correlation in its own cache memory.

④ Next, the terminal 12 executes set-up using the ATM address of the communicating party, establishes a path and communicates with the terminal 14.

Thus, in a case where the ATM address has been registered in the ATM address table 21a, the server 21 operates in the same manner as in the conventional server method.

Figure 14:
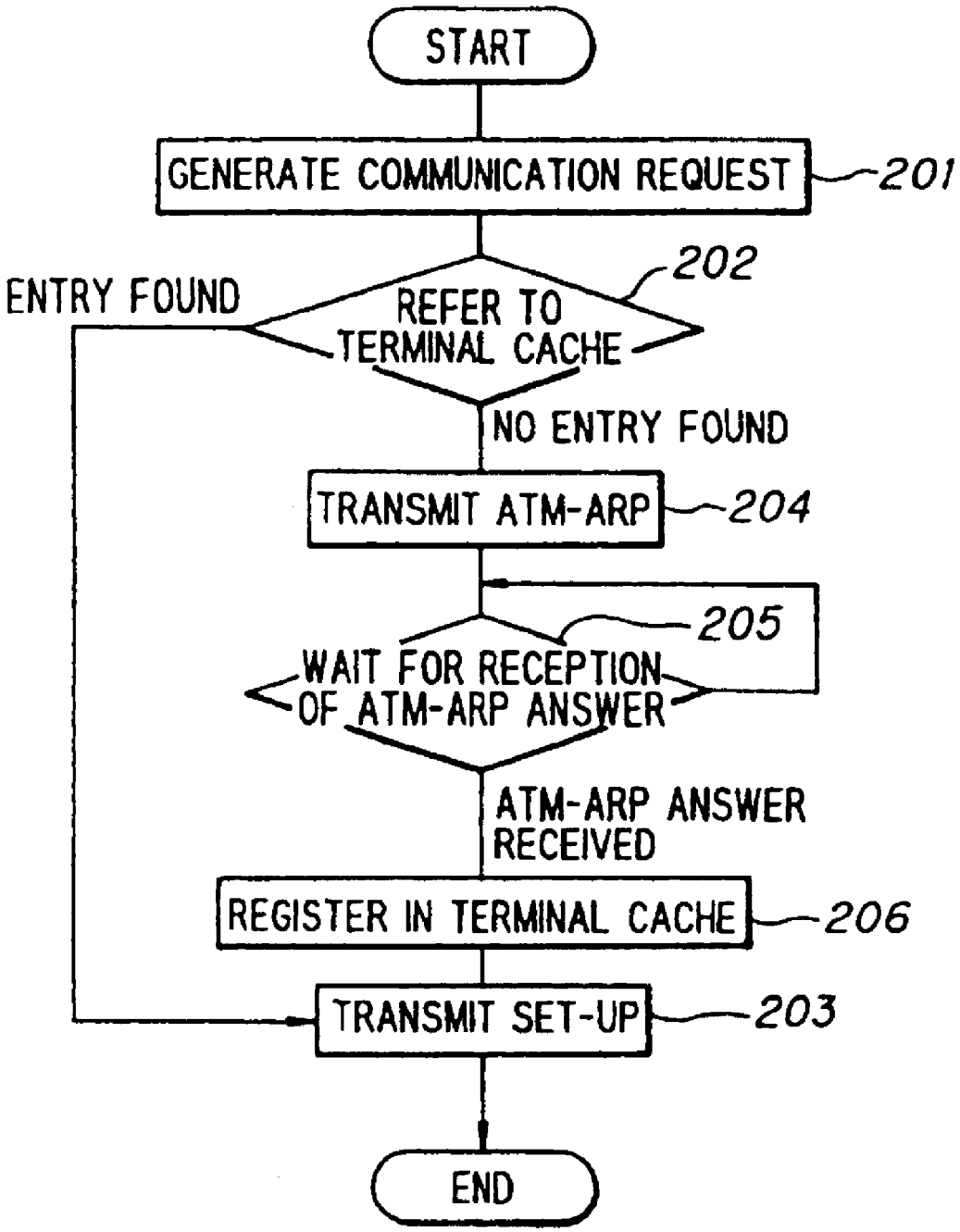
FIG. 14 is a flowchart of processing executed by an originating terminal when a communication request is issued.

(i) Processing at each part of communication sequence (i-1) Processing by originating terminal FIG. 14 is a flowchart of processing executed by an originating terminal when a communication request is issued.

When a communication request is issued (step 201), the terminal refers to its own cache memory and determines whether the ATM address of the communicating terminal is en entry in the memory (step 202). If ATM address is an entry, the terminal executes set-up using the ATM address, establishes a path and performs communication (step 203), If the ATM address is not an entry in the cache memory, however, the terminal puts the ATM-ARP request message into the form of a cell and send the message to the server 21 in order to inquire as to the ATM address corresponding to the protocol address of the communicating party (step 204).

The terminal then waits for transmission of the ATM-ARP answer message from the server 21 (step 205). If the ATM-ARP answer message is received, then the terminal registers the ATM address of the other party's terminal contained in the message in the cache memory (step 206) and subsequently executes set-up using this ATM address, establishes a path and performs communication step (step 203).

(i-2) Processing by terminating terminal

Figure 15:
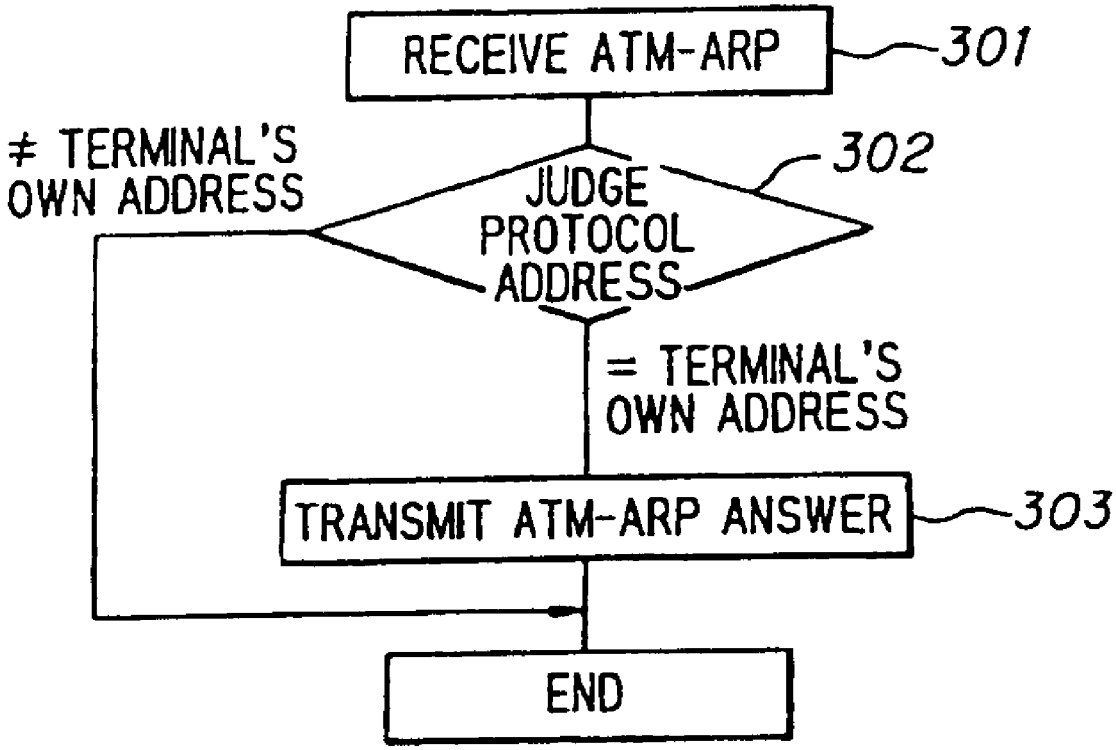
FIG. 15 is a flowchart of processing executed by terminating terminal when an ATM-ARP request is received.

FIG. 15 is a flowchart of processing executed by each terminal when the server broadcasts the ATM-ARP request message to all terminals.

Upon receiving the ATM-ARP request message (an ATM address interrogation request message) from the server 21 (step 301), each terminal determines whether the protocol address of the target terminal contained in this request agrees with its own protocol address (step 302). If agreement with its own protocol address is not achieved, the terminal ends processing. If agreement is achieved, the terminal creates an ATM-ARP response message in order to give notice of its own ATM address and sends the message back to the server 21 in the form of a cell (step 303).

(i-3) Processing flow of server

Figure 16:
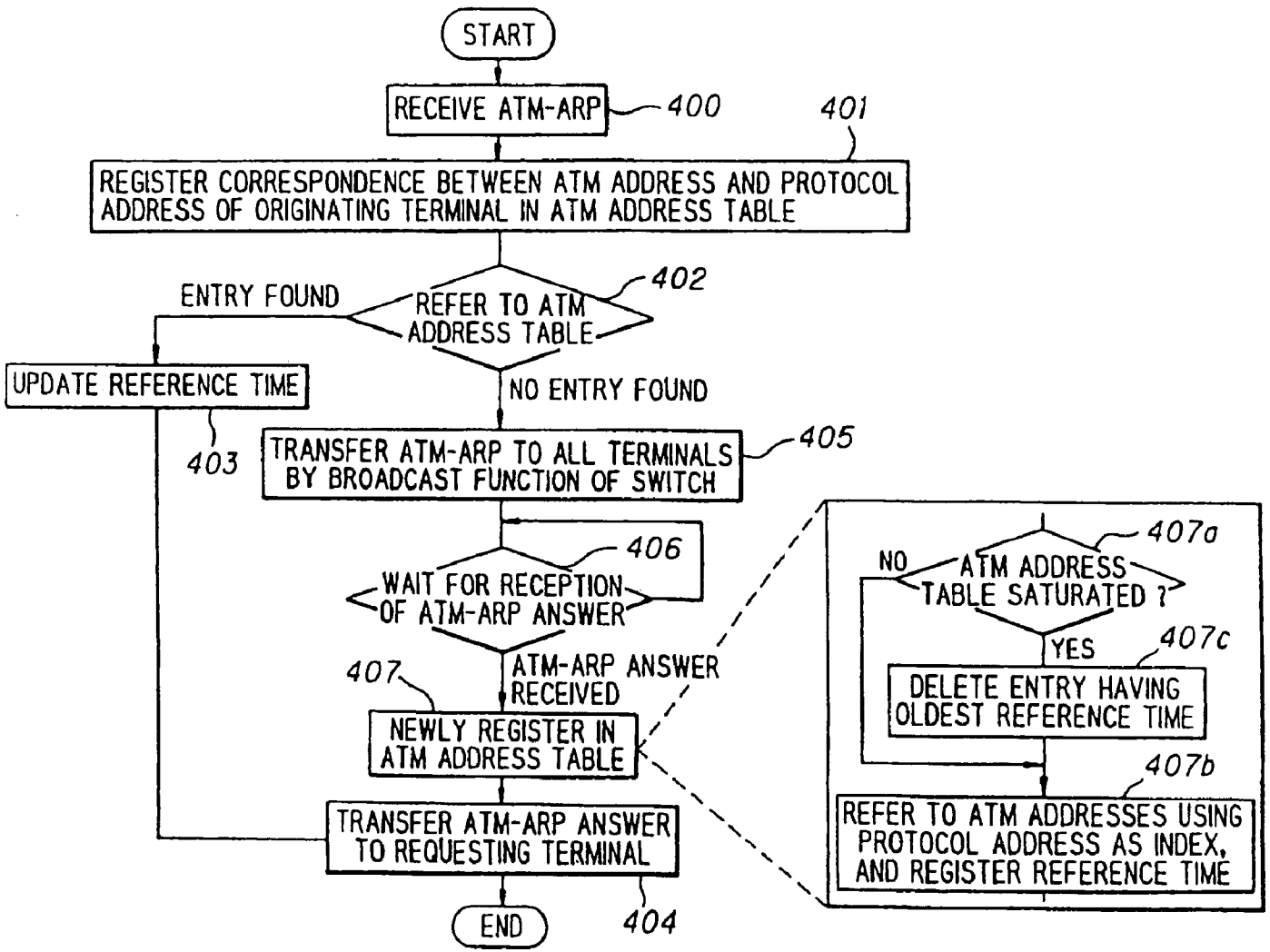
FIG. 16 is a flowchart of processing executed by a server.

FIG. 16 is a flowchart of processing executed by the server for receiving an ATM-ARP request.

Upon receiving an ATM-ARP request from a prescribed terminal (step 400), the server 21 registers the corresponding relationship between the protocol address and ATM address of the original terminal contained in the request, as well as the time, in the ATM address table 21a (step 401).

Next, the server 21 determines whether the ATM address corresponding to the protocol address of the target terminal has been registered in the ATM address table 21a (step 402). If the ATM address has been registered, the reference time in the ATM address table 21a is updated (step 403). The server 21 thenceforth creates an ATM-ARP response message in order to give notice of the above-mentioned ATM address and'sends the message back to the requesting terminal in the form of a cell (step 400).

On the other hand, if it is found at step 402 that the desired ATM address has not bee registered, the server 21 transfers the ATM-ARP request to all terminals using the broadcast function of the ATM switch 42 (step 405). Next, the server waits for reception of the ATM-ARP answer message in response to the above-mentioned ATM-ARP request (step 406).

If the ATM-ARP answer message is received from a prescribed terminal, the server 21 newly registers the ATM address contained in this message as well as the reference time in the ATM address table 21a (step 407).

Processing for registering the ATM address anew is as follows: The server 21 checks to see whether the ATM address table 21a is full (step 407a). If the table is not full, the server 21 *refers to the ATM address using the protocol address as index, and* newly registers the ATM address and reference time in the ATM address table 21a in correspondence with the protocol address of the terminal (step 407b). In a case where the ATM address table 21a is full, the server deletes the entry having the oldest reference time to form a vacancy (step 407c) and registers the new entry (the ATM address and reference time) in this vacancy (step 407b).

After making the new registration, the server 21 creates an ATM-ARP answer message to notify of the ATM address and sends the message back to the requesting terminal in the form of a cell (step 404).

The foregoing is for a case in which the ATM-ARP request is broadcast to all terminals en masse at step 405. However, all of the terminals 11~14 can be divided up into a plurality of groups and the request can be broadcast group by group.

Figure 17:
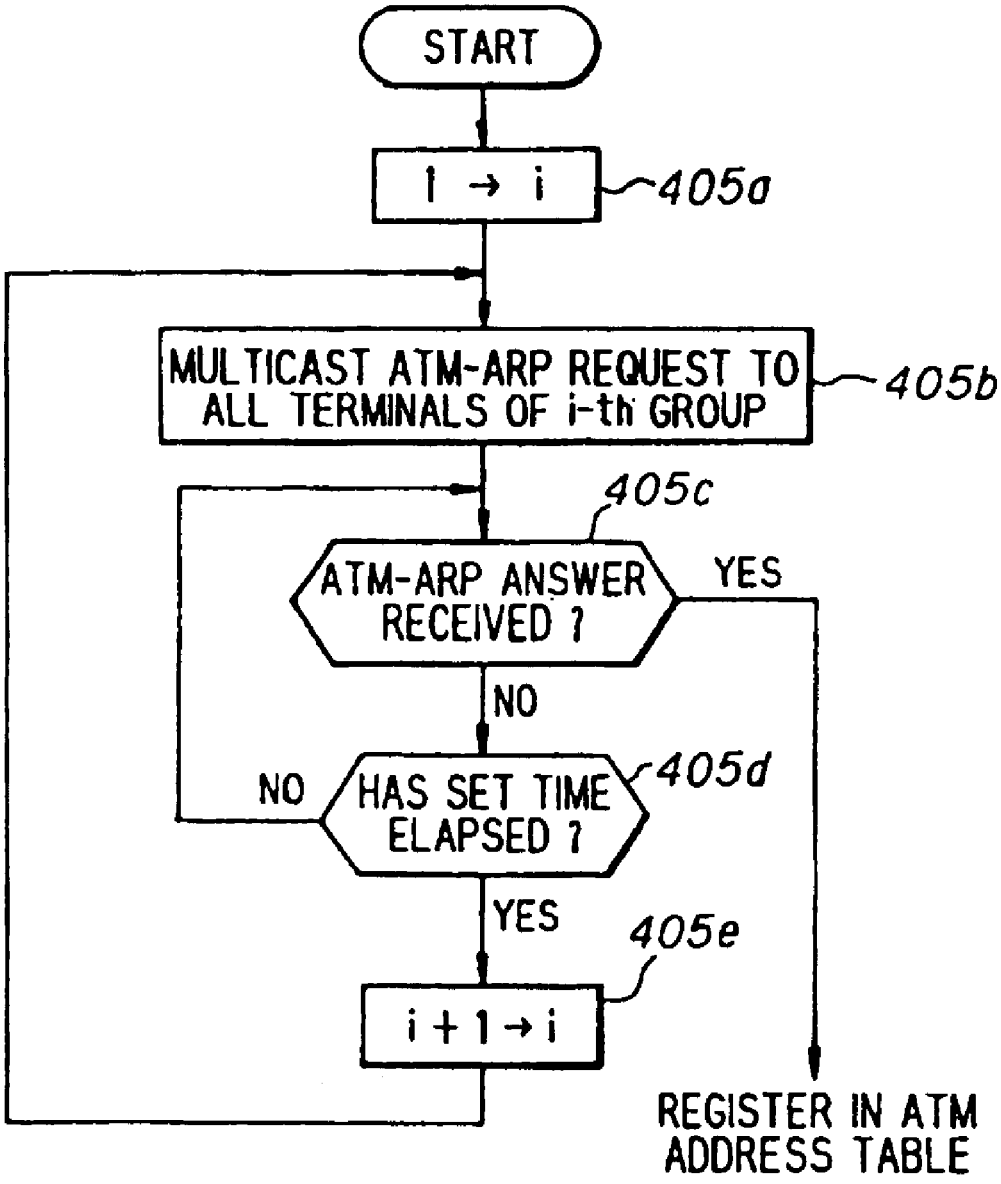
FIG. 17 is a flowchart showing ATM-ARP request transfer processing in a case where a terminal has been divided into groups.

FIG. 17 is a flowchart of such "multicasting".

If it is found at step 402 in FIG. 16 that the desired ATM address has not been registered, the server 21 performs the operation 1→i (step 405a) and then transfers the ATM-ARP request to all terminals of an ith group using a multicasting function of the ATM switch 32 (step 405b). Next, the server 21 determines whether the ATM-ARP answer message which is a response to the above-mentioned ATM-ARP request has been transmitted from the prescribed terminal (step 405c). If the answer message has not been transmitted, the server determines whether time that has elapsed from the multicast has surpassed a set time (step 405d). If the decision rendered is NO, then the program jumps to step 405c and the server wishes for reception of the ATM-ARP answer message.

If the ATM-ARP answer message is not received even upon elapse of the set time, the group is incremented by the operation i+1→i (step 405e) and processing from step 405b onward is executed with regard to the next step.

If the ATM-ARP answer message is received from the prescribed terminal within the set time, then the program jumps to step 407 of FIG. 16 and executes the processing from this step onward.

It should be noted that the ATM address table 21a holds N-number of corresponding relationships between protocol addresses and ATM addresses referred to most recently. Accordingly, by arranging is so that a terminal periodically sends an ATM address interrogation request for its own terminal to the server 21, the corresponding relationship between the terminal's own protocol address and the ATM address can be kept in the ATM address table at all times.

(j) Construction of server

Figure 18:
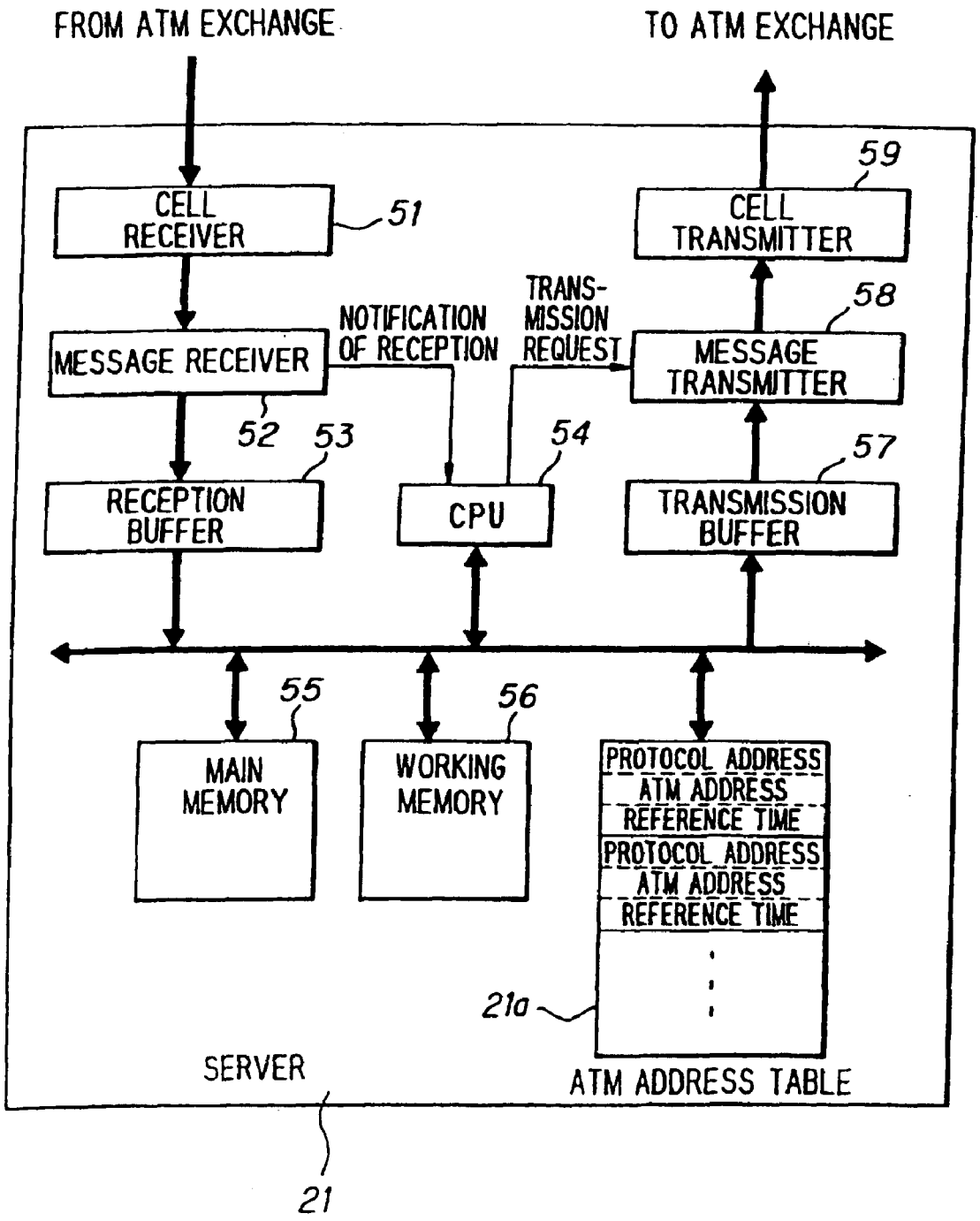
FIG. 18 is a block diagram showing the construction of a server.

FIG. 18 is a block diagram showing the construction of the server 21. The server 21 includes the ATM address *table* 21a, a cell receiver 51, a message receiver 52, a reception buffer 53, a CPU 54, a main memory 55, a working memory 56, a transmission buffer 57, a message transmitter 58 and a cell transmitter 59.

The operation of each unit in response to an ATM-ARP request will now be described.

Upon receiving a cell form the ATM exchange 31, the cell receiver 51 assemblies a cell for every VPI/VCI and transfers the cell to the message receiver 52. The latter transfers the message received from the cell receiver 51 to the reception buffer 53 and notifies the CPU 54, by means of an interrupt, of the fact that an ATM address interrogation request message or answer message has been received.

When the interrupt to notify of reception is generated, the CPU 54 reads in the message from the reception buffer 53, analyzes the operation code (see FIG. 12) contained in the message and identifies whether the message is in the ATM address interrogation request message or answer message.

When received message is interrogation request message

If the received message is the interrogation request message, the CPU 54 registers, in the table 21a, the corresponding relationship between the protocol address and ATM address of the originating terminal contained in the message. Next, the CPU 54 executes processing to search the ATM address table 21a using the protocol address of the target as an index. If the target ATM address has been registered in the *ATM address* table 21a, the CPU 54 creates an answer message for giving notice of the ATM address, writes the message in the transmission buffer 57 and requests the message transmitter 58 to transfer the answer message to the originating terminal based upon the prescribed VPI/VCI.

If the target ATM address has not been registered in the ATM address table 21a, however, the CPU 54 transfers the interrogation request message stored in the reception buffer 53 to the transmission buffer 57 and requests the message transmitter 58 to carry out a transfer based upon the VPI/VCI for the purpose of broadcast.

When received message is answer message

If the received message is the answer message, on the other hand, the CPU 54 correlates the target ATM address contained in the answer message with the target protocol address, registers the correlation in the ATM address 21a and transfers the answer message in the reception buffer 53 to the transmission buffer 57 as is. Thereafter, the CPU 54 requests the message transmitter 58 to transfer the above-mentioned answer message to the originating terminal based upon the prescribed VPI/VCI.

Upon receiving the transmission request from the CPU 54, the message transmitter 58 transfers the data in the transmission buffer 57 to the cell transmitter 59 and gives notice of the value of the VPI/VCI. The cell transmitter 59 transfers the message, which has been received from the message transmitter 58, to the ATM exchange 31 upon forming the message into a cell based upon the VPI/VCI of which it has been notified.

(k) Construction of terminal

Figure 19:
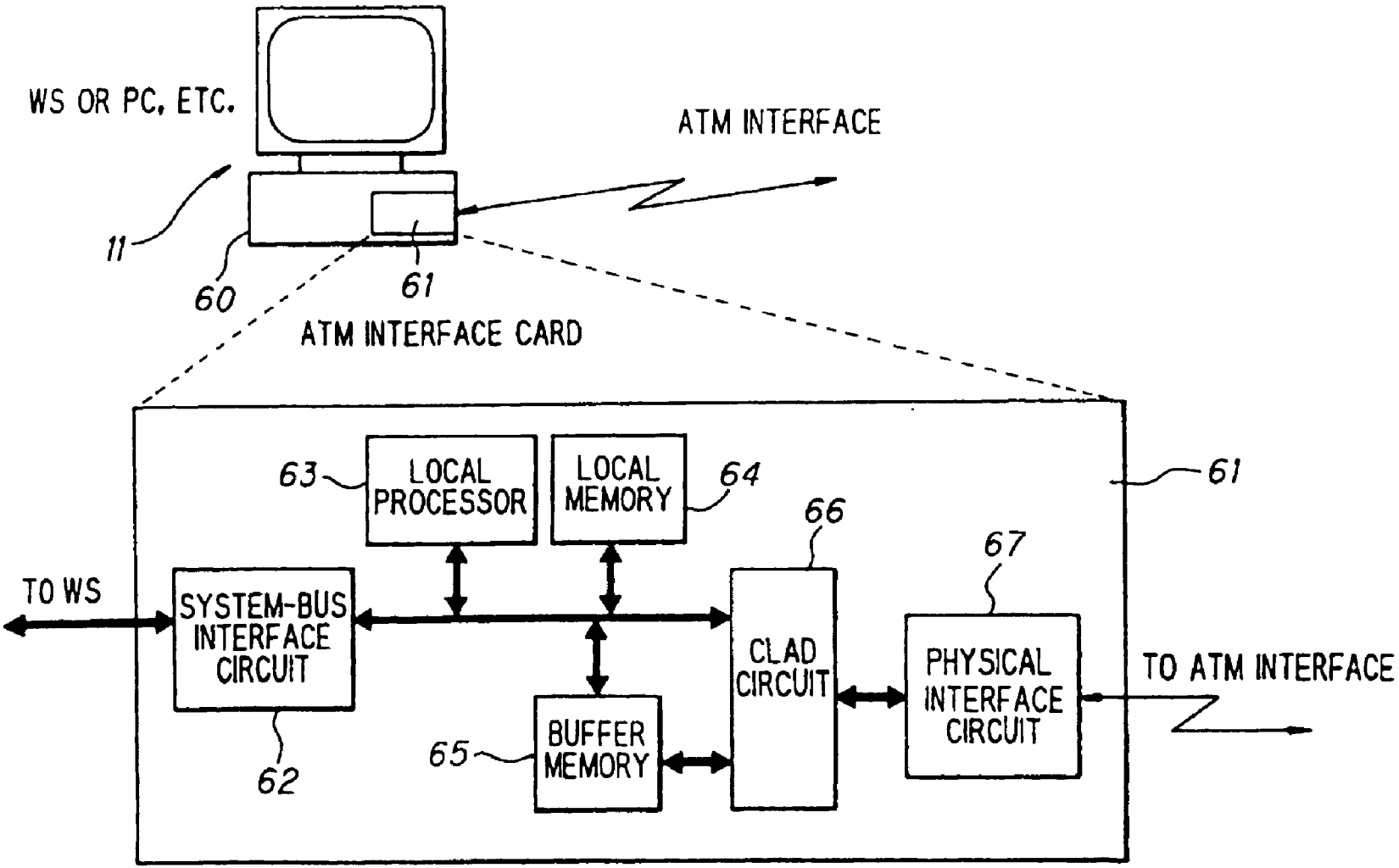
FIG. 19 is a diagram showing the construction of a terminal.

FIG. 19 is a diagram showing the construction of the terminals 11~14. Numeral 60 denotes the main body of a work station (WS) or personal computer (PC), which has an ATM interface card 61. The ATM interface card 61 includes a system-bus interface circuit 62, a local processor 63, a local memory 64, a buffer memory 65, a CLAD (cell assembly/disassembly) circuit 66 and a physical interface circuit 67.

The operation of each component of the ATM interface card will now be described.

The ATM interface card 61 mounts the local processor 63 and the local memory 64, which stores various programs, and is connected with the WS or PC 60 by loose coupling implemented by communication between memories. Examples of the programs are a program for managing the overall ATM interface card, a control program for the ATM address notification request and for giving notice of an answer, a communication control program, etc.

The system-bus interface circuit 62 has a control mechanism for communicating with the WS or PC 60. The circuit 62 provides an interface dependent upon the WS or PC. A communication request message generated by an application in the WS is transferred to the local memory 64 via the system-bus interface circuit 62.

Upon receiving the communication request message, the local processor 63 obtains the ATM address of the other party's terminal based upon the destination protocol address contained in the message. That is, since the correspondence between the protocol address and the ATM address has been stored in, say, a storage area (address cache memory) in the local memory 64, the processor 63 searches the address cache memory.

If the ATM address corresponding to the destination protocol address has not been registered in the cache memory, the local processor 63 creates the ATM address interrogation request message, stores the message in the buffer memory 65 and starts up the CLAD circuit 66. As a result, the CLAD circuit 66 forms the ATM address interrogation request message into a cell (VPI/VCI=FF–FFFF) and transfer the cell to the ATM exchange 31 via the physical interface circuit 67.

When notice of the ATM address in response to the interrogation request is received from the ATM exchange 31, the local processor 63 registers the ATM address in the address cache memory. Thereafter, the local processor 63 starts up the communication control program, creates a set-up message using the received ATM address under the control of the communication program and stores the message in the buffer memory 65. The CLAD circuit 66 forms the set-up message into a cell and transfers the cell to the ATM exchange 31 via the physical interface circuit 67. It should be noted that if the ATM address has been registered in the address cache memory, the local processor 63 creates the set-up message immediately without making an inquiry and transfers the message to the ATM exchange 31.

The ATM exchange 31 executes call processing in response to the set-up message and sends back a connect message. Upon receiving the connect message via the physical interface circuit 67, the CLAD circuit 66 forms the message into a cell, stores the cell in the buffer memory 65 and notifies the local processor 63 of receipt of the message. As a result, the local processor 63 accepts the connect message from the buffer memory 65, verifies establishment of the communication path based upon the message and terminates the communication control program.

Thereafter, the local processor 63 starts message transfer using the identifier (VPI/VCI) of the communication path of which it has been notified by the connect message. More specifically, in response to establishment of the communication path, the local processor 63 stores the message received from the WS or PC in the buffer memory 65 and notifies the CLAD circuit 66 of the identifier (VPI/VCI) of the set communication path. As a result, the CLAD circuit 66 forms the message in the buffer memory 65 into a cell using the value of the VPI/VCI and transfers the cell to the ATM exchange 31 via the physical interface circuit 67.

In a case where a cell stream is received from the ATM exchange 31 via the physical interface circuit 67, the CLAD circuit 66 disassembles the cell and assembles a message, stores the message in the buffer memory 65 and then notifies the local processor 63 of the fact that the message has been received. In response to notification of receipt from the CLAD circuit 66, the local processor 63 accepts the message from the buffer memory 65 and transfers the message to the WS via the system-bus interface circuit 62.

(l) Construction of server accommodation section

Figure 20:
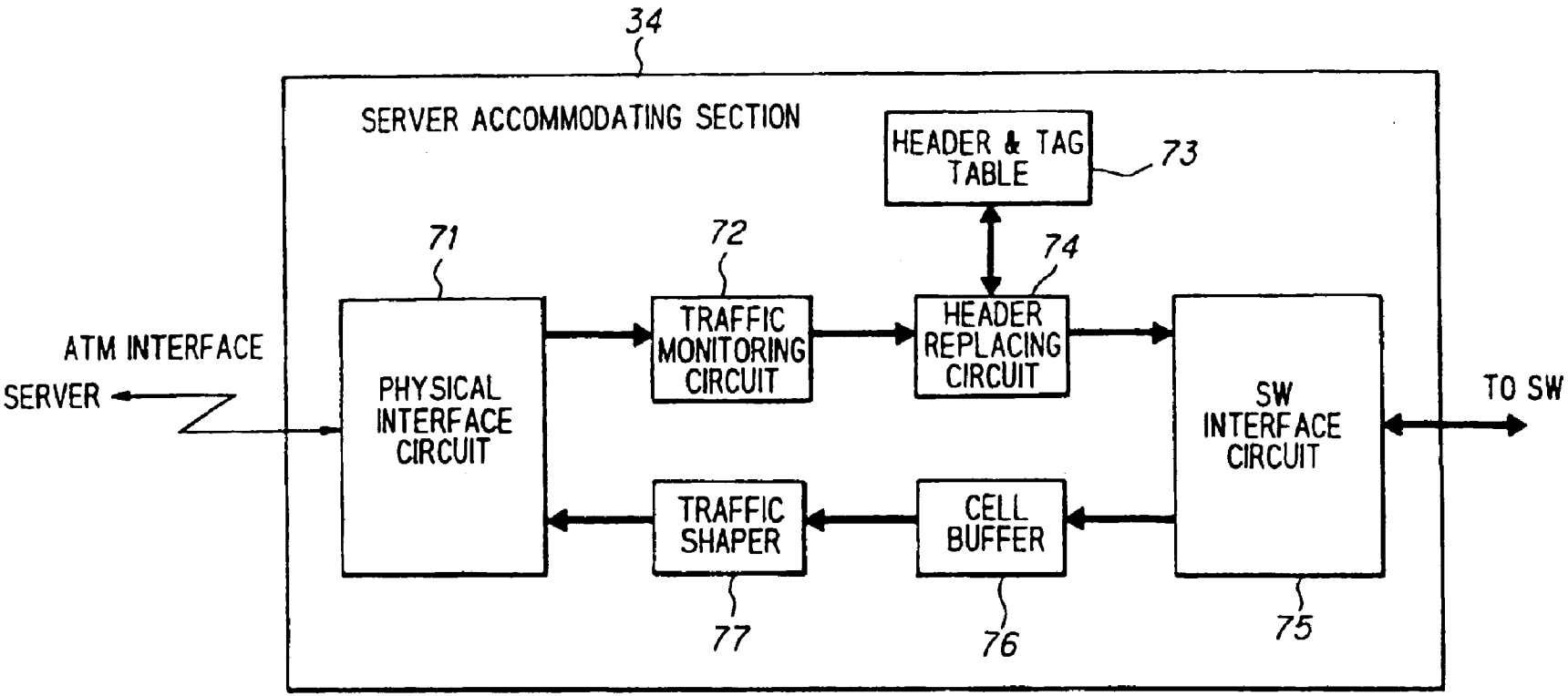
FIG. 20 is a block diagram showing the construction of a server accommodating section.
Figure 21:
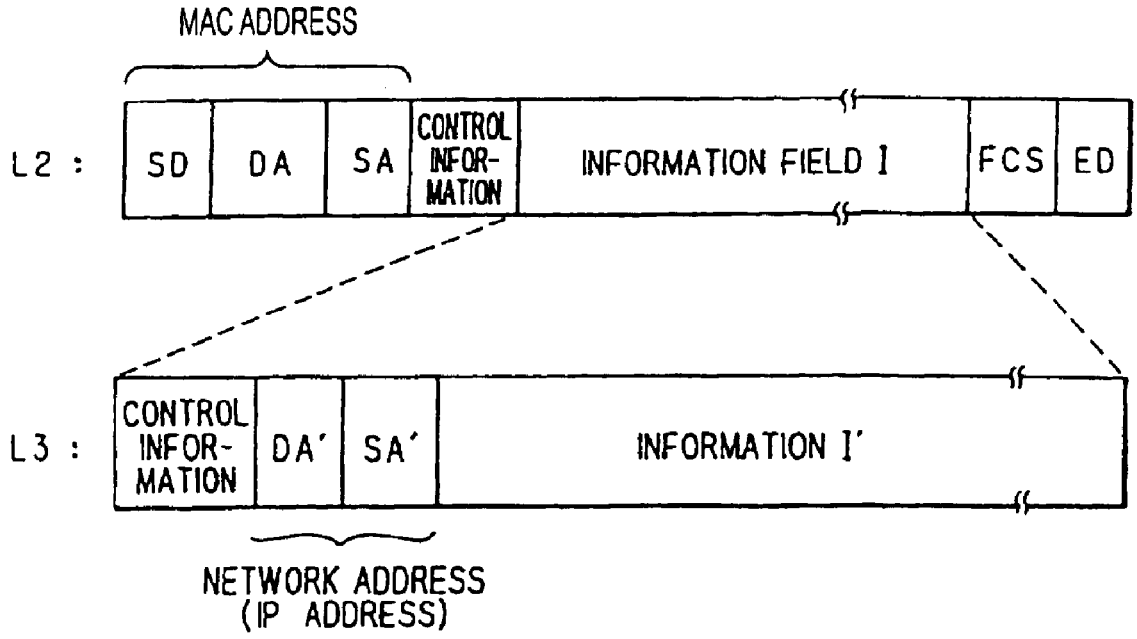
FIG. 21 is a diagram showing the constitution of a frame.
Figure 22:
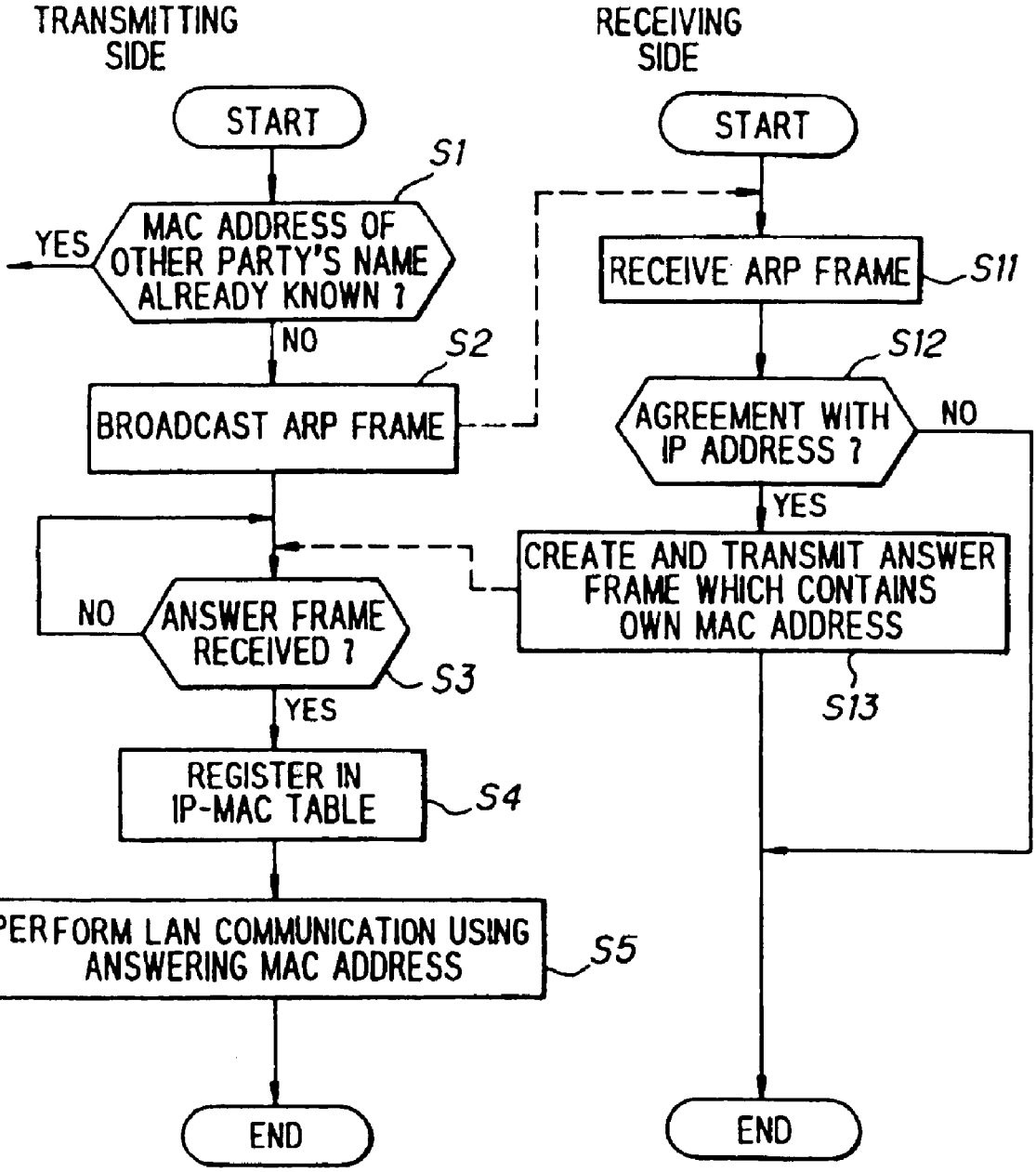
FIG. 22 PRIOR ART
FIG. 22 is a flowchart of ARP processing in a LAN according to the prior art.

FIG. 20 is a block diagram showing the construction of a server accommodating section 34. The construction is the same for the terminal accommodating sections 33a~33d as well. The server accommodating section 34 includes a physical interface 71 for sending cells to and receiving cells from the server, a traffic monitoring circuit 72 for determining whether cells are being transmitted at a declared speed, a header tag table (routing table) 73 which stores ① tag information and ② a new VPI/VCI, which is to be replaced, in correspondence with a VCI, a header replacing circuit 74, a switching interface circuit 75 for administering interfacing with the ATM exchange 31, a cell buffer 76 which stores a cell entered from the ATM exchange 31, and a traffic shaper 77 which performs control in such a manner that cells are transmitted at a desired traffic.

In accordance with the present invention, the arrangement is such that if an ATM address has been registered in the ATM address table of a server when an interrogation request has been issued for this ATM address, the target ATM address can be obtained through an operation similar to that performed in the conventional server method. If the ATM address has not been registered in the ATM address table, however, the target ATM address can be obtained by broadcasting the interrogation request for the ATM address. In other words, according to the invention, ATM addresses are managed by making joint use of the server method and broadcast method. This makes it possible to hold down at increase in control traffic. Moreover, ATM addresses can be perfected by successively registering corresponding relationships, which have been found using the broadcast method, in the ATM address table. In addition, it is possible to dispense with a task for initially setting the ATM address table and a task for updating the table when terminals are added on or moved.

Further, in accordance with the present invention, all terminals are divided up into a plurality of groups. When a broadcast is made, the server transfers the ATM address interrogation request cell to all terminals of the first group. If there is no notice of answer of the ATM address within a set time, the server transfers the interrogation request cell to all terminals of the next group. Thenceforth, and in similar fashion, the server transfers the interrogation request cell while successively changing groups until the prescribed terminal answers with the ATM address. As a result, there is a good possibility that the desired ATM address will be obtained without broadcasting the interrogation request cell to all terminals. Consequently, an increase in traffic can be suppressed.

Furthermore, in accordance with the invention, (1) upon receiving notification of the ATM address from the prescribed terminal, the server newly registers the correspondence between the protocol address of this terminal and the ATM address, of which it has been notified, in the ATM address table. Further, (2) the server registers, in the ATM address table, the corresponding relationship between the protocol address of the originating terminal, which address is contained in the ATM address interrogation request received from the originating terminal, and the ATM address. Accordingly, if an inquiry for the above-mentioned ATM address is issued after registration, it is unnecessary to broadcast this interrogation request; the ATM address can be obtained in simple fashion from the ATM address table.

Further, in accordance with the present invention, if the ATM address table is full when the prescribed terminal has answered with the ATM address, the server erases the oldest corresponding relationship referred to and newly registers the ATM address of which it has been notified in the ATM address table. As a result, a large-capacity ATM address table is unnecessary and the scale of the server hardware can be minimized.

Furthermore, in accordance with the invention, a terminal periodically sends an ATM address interrogation request for its own terminal to the server, whereby the corresponding relationship between the terminal's own protocol address and the ATM address can be kept in the ATM address table at all times.

As many apparently widely different embodiments of the present invention can be made without departing from the spirit and scope thereof, it is to be understood that the invention is not limited to the specific embodiments thereof except as defined in the appended claims.

What is claimed is:

1. An address management method in a communication system equipped with a plurality of terminals, *and* a server [having an address table] for [storing] *registering* a corresponding relationship between a [protocol] *first* address and [terminal] *a second* address of each terminal, [and an exchange which accommodates each terminal and the server, said] *the* method comprising *the steps of*:

[a first step in which an originating terminal sends a terminal address interrogation request to the server if the terminal address of another party's terminal is unknown at the time of communication;

a second step in which the server, upon receiving the terminal address interrogation request from the terminal, refers to the address table and searches for a terminal address corresponding to a protocol address contained in said interrogation request;

a third step in which, if a terminal address corresponding to said protocol address is obtained from the address table, the server notifies the terminal of this terminal address;

a fourth step in which, if the terminal address is not obtained from the address table, the server transfers the terminal address interrogation request containing said protocol address to all terminals via the exchange;]

*sending, to the server by an originating terminal, an address interrogation request which includes a fist value indicative of a request and a first address;*

*transferring, to a plurality of terminals by the server, the address interrogation request which includes the first value and the first address;*

[the fifth step in which, when] *receiving, by* each terminal [receives] the [terminal] address interrogation request transferred from the server[, the terminal determines]*;*

*determining by each terminal* whether the [protocol] *first* address [contained] *included* in the *address* interrogation request *received from the server* agrees with [its] *a terminal's* own [protocol] *first* address [and notifies the server of its own terminal address if agreement is achieved; and,]*;*

[a sixth step in which the server notifies the originating terminal of the terminal address of which it has been notified]

*notifying, by each terminal, in response to the address interrogation request, the server of an answer which includes a terminal's own second address which is not registered in the server and a second value indicative of an answer when agreement is achieved;*

*receiving, from one of the plurality of terminals by the server, the answer which includes the second value and the second address which corresponds to the first address; and*

*registering, in the server, a corresponding relationship between the first address and the second address which is included in the answer.*

2. The method according to claim 1, *in the communication system which includes a switch or exchange which accommodates each terminal and the server,* wherein [said fourth] *the transferring* step includes:

a step in which the exchange *or switch* connects the server with [all] *a plurality of* terminals by PVCs (permanent virtual channels) [having identical values]; and a step in which, when [a terminal] *an* address interrogation request having [said identical] *a predetermined* value for *a* PVC has entered from the server, the exchange *or switch* performs cell copying, whereby [said] *the address* interrogation request cell is transferred to [all] *the plurality of* terminals.

3. The method according to claim 1, *in the communication system which includes a switch or exchange which accommodates each terminal and the server,* wherein [said fourth] *the transferring* step includes:

a step in which the exchange *or switch* connects the server with [all] *a plurality of* terminals by PVCs (permanent virtual channels) [having identical values] and divides [all] *the plurality of* terminals into a plurality of groups;

a step in which, when [a terminal] *an* address interrogation request having [said identical] *a predetermined* value for *a* PVC has entered from the server, the exchange [or switchperforms cell copying, wherein [said] *the address* interrogation request cell is transferred to all terminals in first group;

a step in which the server performs monitoring to determine whether a prescribed terminal has answered with a [terminal] *second* address within a set period of time;

a step in which the server sends the *address* interrogation request cell to [all] *the plurality of* terminals of the next group if no terminal answers with a [terminal] *second* address within the set period of time; and a step in which the server transfers the *address* interrogation request *cell* while successively changing the group until a prescribed terminal answers with a [terminal] *second* address.

[4. The method according to claim 1, further comprising a seventh step in which, when the server receives the answer of the terminal address from the terminal, the server newly stores the corresponding relationship between said protocol address and the terminal address, of which it has been notified, in the address table.]

[5. The method according to claim 1, further comprising an eighth step in which the server stores, in the address table, corresponding relationship between the protocol address of the originating terminal and the terminal address which are contained in the terminal address interrogation request received from said originating terminal.]

6. [The method according to claim 1, further comprising:

a seventh step in which, when the server receives the answer of the terminal address from the terminal, the server deletes a corresponding relationship, referred to least recently, between a protocol address and terminal address if the address memory is full] *An address management method in a communication system equipped with a plurality of terminals, and a server for registering a corresponding relationship between a first address and a second address of each terminal, the method comprising the steps of:*

*sending, to the server by an originating terminal, an address interrogation request which includes a first value indicative of a request and a first address;*

*transferring, to a plurality of terminals by the server, the address interrogation request which includes the first value and first address;*

*receiving, by each terminal, the address interrogation request transferred from the server;*

*determining by each terminal whether the first address included in the address interrogation request from the server agrees with a terminal's own first address;*

*notifying, by the terminal, in response to the address interrogation request, the server of an answer which includes a terminal's own second address which is not registered in the server and a second value indicative of an answer when agreement is achieved;*

*receiving, from one of the plurality of terminals by the server, the answer which includes the second value and the second address which corresponds to the first address;*

*deleting a corresponding relationship, referred to least recently, between a first address and a second address if the server cannot accommodate a corresponding relationship between the first address and second address included in the answer received form a prescribed terminal;* and

[an eight step] *registering,* in [which] *a memory by* the server [newly stores the], *a* corresponding relationship between said protocol] *the first* address and the [terminal]*second* address[, of] which [is has been notified,] *is included* in the [address table] *answer.*

[7. The method according to claim 1, further comprising a ninth step in which each terminal sends periodically the server an interrogation request for its own terminal's address, whereby the corresponding relationship between its own terminal's protocol address and the terminal address is kept in the address table.]

8. A communication system equipped with a plurality of terminals, *and* a server [having an address table] for [storing] *registering* a corresponding relationship between a [protocol] *first* address and [terminal] *second* address of each terminal, [and an exchange which accommodates each terminal and the server,] wherein each of the [said] *the* terminals comprises:

means for sending [a terminal], *to the server, an* address interrogation request [to the server if the terminal address of another party's terminal is unknown at the time of communication] *which includes a first value indicative of a request and a first address; and*

[communication means for communicating with the other party's terminal via the exchange using a terminal address of which it has been notified by the server in response to the interrogation request; and]

[Terminal address answering] means for answering the server with *an answer including* its own [terminal] address [if] *which is not registered in the server and a second value indicative of an answer when* a [protocol] *first* address [contained], *included* in an [a terminal] address interrogation request [transferred] *which has been received* from the server agrees with its own [protocol] *first* address; and

[said] *the* server comprises:

[means for referring to the address table and searching for a terminal address corresponding to a protocol address contained in a terminal address interrogation request from a terminal;]

means [which, if a terminal address corresponding to said protocol address has not been registered in the address table, is] for transferring the [terminal] address interrogation request [containing said protocol] *which includes the first value and the first* address to [all] *a plurality of* terminals [via the exchange]; and

[means for notifying the terminal which has issued the interrogation request of a terminal address found from the address table or of a terminal address obtained by an answer from a terminal]

*registration means for registering, in the server, a corresponding relationship between the first address and the second address which is included in the answer which has been received from one of the plurality of terminals in response to the address interrogation request which has been transferred from the server.*

[9. The communication system according to claim 8, wherein said exchange comprises:

means for connecting the server with all terminals by PVSs (permanent virtual channels) having identical values; and means which, when a terminal address interrogation request having said identical value for PVC has entered from the server, is for performing cell copying and transferring said interrogation request cell to all terminals.]

[10. The communication system according to claim 8, wherein said server has registration means which, when the server receives the answer of the terminal address from a prescribed terminal, is for newly storing the corresponding relationship between a protocol address and the terminal address, of which it has been notified, in the address table.]

11. The communication system according to claim [10] *8*, wherein when the server [receives the answer of the terminal address] *cannot register a corresponding relationship between the first address, and second address included in the answer which is received* from the prescribed terminal, [said] *the* registration means deletes a corresponding relationship, referred to least recently, between a [protocol] *first* address and [terminal] *second* address [if the address memory is full].

12. A server in a communication system equipped with a plurality of terminals, [the server for managing a corresponding relationship between a protocol address and terminal address of each terminal, and an exchange which accommodates each terminal and the server, said] *the* server comprising:

[an address table for storing the corresponding relationship between a protocol address and terminal address of each of the plurality of terminals;

search means for referring to said address table and searching for a terminal address corresponding to a protocol address contained in a terminal address interrogation request from a terminal; and]

interrogation means [which, if a terminal address corresponding to the protocol address has not been registered in the address table, is] for [interrogating all] *receiving, from an originating terminal, an address interrogation request including a first value indicative of a request and a first address, and for transferring the address interrogation request to a plurality of* terminals[, via an exchange, or the terminal address corresponding to this protocol address; wherein in response to receipt of a terminal address interrogation request from an originating terminal, said search means refers to said address table to obtain the terminal address conforming to the protocol address contained in this terminal address interrogation request and, if this terminal address has not been registered, said interrogation means interrogates the terminals for terminal address]*;*

*means for receiving, form one of the plurality of terminals having it's own second address which is not registered in the server, an answer including a second value indicative of an answer and a second address which corresponds to the first address, in response to the address interrogation request which has been transferred from the server; and*

*registration means for registering, in a memory, a corresponding relationship between the first address and the second address which is included in the answer.*

[13. The server according to claim 12, further comprising:

means for receiving notification of an answer from a prescribed terminal in response to the terminal address interrogation request; and registration means for newly registering the corresponding relationship between the protocol address and the terminal address, of which it has been notified, in said address table.]

14. The server according to claim [13] *12*, wherein when the server receives [the]*an* answer [of the terminal] *including a second value indicative of an answer and a second* address from the [prescribed terminal] *one of the plurality of terminals*, [said] *the* registration means deletes a corresponding relationship, referred to least recently, if [said address memory is full] *the server can not accommodate a corresponding relationship between the first address and second address,* and registers*, in a memory of the server,* the corresponding relationship between the [protocol] *first* address and the [terminal] *second* address[, of which it has been notified, in said address table] *which is included in the answer*.

15. The server according to claim 12, wherein [said terminal address] *the* interrogation means divides [all] *a plurality of* terminals into a plurality of groups, interrogates all terminals of a first group for a [terminal] *second* address and, if notification of *an* answer [of a terminal] *including the second* address is not received within a set period of time, interrogates all terminals of the next group for a [terminal] *second* address.

*16. In a network system having a server, the method of registering in the server a corresponding relationship between a first identifier and a second identifier for a communication party, comprising the steps of:*

*receiving an interrogation request including a first value indicative of a request and a first identifier;*

*determining a corresponding second identifier is not registered in the server;*

*transferring the interrogation request to a plurality of terminals which can accommodate the communication party;*

*receiving, from a terminal having it's own second identifier which is not registered in the server, an answer including a second value indicative of an answer and a second identifier which corresponds to the communication party identified by the first identifier, in response to the interrogation request; and*

*registering a corresponding relationship between the first identifier and the second identifier which is included in the answer.*

*17. The method according to claim 16, wherein the corresponding relationship between the first identifier and the second identifier is registered in a vacancy which has been formed by deleting an entry which has a corresponding relationship between a first identifier and a second identifier.*

*18. The method according to claim 17, wherein the vacancy is formed by deleting an entry which has the oldest reference time.*

*19. The method according to claim 16, wherein the system includes a switch or exchange and wherein the transferring step includes:*

*a step in which the switch or exchange connects the server with a plurality of terminals by PVCs (permanent virtual channels);*

*a step in which, when the interrogation request, in the form of a cell having a predetermined virtual channel identifier, is entered from the server, the switch or exchange appends tag information indicating a terminal group to the cell, performs cell copying based on the tag information indicating the terminal group, and transfers the cell to terminals of the terminal group.*

*20. The method according to claim 16, wherein the system includes a switch or exchange and wherein the transferring step includes:*

*a step in which the switch or exchange connects the server with a plurality of terminals by PVCs (permanent virtual channels) and divides the plurality of terminals into a plurality of groups;*

*a step in which, when the interrogation request in the form of a cell is entered from the server, the switch or exchange performs cell copying, whereby the interrogation request cell is transferred in a first group;*

*a step in which the server performs monitoring to determine whether a prescribed terminal has answered with its own identifier within a set period of time;*

*a step in which the server sends the interrogation request cell to all terminals of the next group when no terminal answers with its own identifier within the set period of time; and*

*a step in which the server transfers the interrogation request while successively changing the group until a prescribed terminal answers with its own identifier.*

*21. The method according to claim 16, further comprising a step in which, when the server receives the answer including the second identifier and the second value from the one of the plurality of terminals, the server registers the corresponding relationship between the first identifier and the second identifier in place of a memory in the server designated by an index value which is calculated based on a value of the first identifier or the second identifier.*

*22. The method according to claim 16, further comprising a step in which the server periodically receives an interrogation request including a second identifier and a second value indicative of an answer from each terminal of the plurality of terminals, whereby the corresponding relationship between the first identifier of its own terminal and the second identifier is kept in a server.*

*23. The method of claim 16 wherein the plurality of terminals are a plurality of ATM terminals.*

*24. The method of claim 16 wherein the first identifier is a protocol address.*

*25. The method of claim 16 wherein the second identifier is a terminal address.*

*26. In a network system having a server, the method comprising the steps of:*

*receiving, from an originating terminal by the server, an address interrogation request including a first address and a first value indicative of a request;*

*transferring, by the server, the address interrogation request to a plurality of terminals;*

*receiving, from an originating terminal by the server, an answer including a second value indicative of an answer and second address which corresponds to a first address;*

*deleting, from the server, an entry which has a corresponding relationship between a first address and a second address from the server to form a vacancy when the server cannot register a corresponding relationship between the first address and the second address which is included in the answer; and*

*registering in a vacancy of the server a corresponding relationship between the first address and the second address which is included in the answer.*

*27. The method according to claim 26, wherein the vacancy is formed by deleting the entry which has the oldest reference time.*

*28. An address resolution system equipped with a plurality of terminals, a switch or exchange which accommodates each terminal of a plurality of terminals and a server, wherein*

*each terminal of the plurality of terminals comprises:*

*means for sending a terminal address interrogation request which includes a first value indicative of a request and a first address to the server if a second address of another party's terminal is unknown at the time of communication; and*

*means for answering the server with an answer including a terminal own second address and a second value indicative of an answer when a first address included in a terminal address interrogation request received from the server agrees with a terminal own first address; and*

*the server comprises:*

*means for transferring the terminal address interrogation request including the first value indicative of the request and the first address to the plurality of terminals; and*

*receiving means for receiving, in response to the terminal address interrogation request which has been transferred by the server, an answer including a second address corresponding to the first address from one of the plurality of terminals;*

*means for registering in the server a corresponding relationship between the first address and the second address which has been included in the answer.*

*29. The address resolution system according to claim 28, wherein the switch or exchange comprises:*

*means for connecting the server with a plurality of terminals by PVCs (permanent virtual channels); and*

*means which, when a terminal address interrogation request cell having a predetermined value for a PVC is entered from the server, is for performing cell copying and transferring of the interrogation request cell to the plurality of terminals.*

*30. The address resolution system according to claim 28, wherein the server has registration means which when the server receives the answer including the second address corresponding to the first address from one of the plurality of terminals, is for registering a corresponding relationship between the first address and the second address in a place designated by an index value which is calculated based on a value of the first address or the second address.*

*31. The address resolution system according to claim 28, wherein when the server receives the answer including the*

*second address corresponding to the first address from the one of the plurality of terminals, the registration means deletes an entry which has a corresponding relationship between a first address and a second address from the server when the server cannot accommodate an entry having a corresponding relationship between the first address and the second address which are included in the answer which has been received from the one of the plurality of terminals.*

*32. A sever comprising:*

*means for receiving, from an originating terminal, an address interrogation request including a first address and a first value indicative of a request;*

*means for transferring the address information request to a plurality of terminals;*

*means for receiving an answer including a second value indicative of an answer and a second address which corresponds to the first address from one of the plurality of terminals in response to the address interrogation request which has been transferred; and*

*means for registering, in a memory of the server, a corresponding relationship between the first and the second address in a place designated by an index value which is calculated based on a value of the first address or the second address,*

*wherein when the server receives the answer including the second address corresponding to the first address from the one of the plurality of terminals, the registration means deletes a corresponding relationship, referred to least recently, when the server can not accommodate a corresponding relationship between the first address and the second address, and registers the corresponding relationship between the first address and the second address which is included in the answer.*

*33. The server according to claim 32, wherein the terminal address interrogation means diverts terminals into a plurality of groups, interrogates terminals of a first group for a second address and, when a notification of an answer including a second address is not received within a set period of time, interrogates the terminals of the next group for a second address.*

*34. In a network system including communication parties accommodated by terminals, a method of registering a corresponding relationship between a first identifier and a second identifier for a communicating party, comprising the steps of:*

*when a communication request is issued, determining, in a terminal accommodating an originating party, whether a second identifier for another communicating party is registered;*

*sending to a server an interrogation request including a first value indicative of a request and a first identifier of the other communicating party when the second identifier is not registered in the terminal;*

*transferring, by the server, the interrogation request to a plurality of terminals which can accommodate the other communicating party when the second identifier corresponding to the first identifier is not registered in the server;*

*receiving, at the server, an answer including a second value indicative of an answer and the second identifier which corresponds to the other communicating party identified by the first identifier in response to the interrogation request, said answer from a terminal having it's own second identifier which is not registered in the server;*

*sending the answer to the terminal accommodating the originating party; and*

*registering, in the terminal accommodating the originating party, a corresponding relationship between the first identifier and the second identifier which is included in the answer.*

*35. The method of claim 34 wherein the receiving step further includes:*

*registering, in the server, the corresponding relationship between the first identifier and the second identifier which is included in the answer.*

*36. The method of claim 34 wherein when the second identifier corresponding to the first identifier is registered in the server, the server responds to the interrogation request by sending the answer to the terminal accommodating the originating party.*

*37. The method of claim 34 wherein the plurality of terminals are a plurality of ATM terminals.*

*38. The method of claim 34 wherein the first identifier is a protocol address.*

*39. The method of claim 34 wherein the second identifier is a terminal address.*

*40. A network identifier resolution system equipped with a plurality of terminals, a switch or exchange which accommodates each terminal of a plurality of terminals and a server, wherein:*

*each terminal of the plurality of terminals comprising:*

*a processor that receives a communication request message, determines a first identifier from the communication request message, checks a local storage area for a corresponding second identifier, and when a second identifier is not registered, creates an interrogation request message which includes a first value indicative of a request and the first identifier; and*

*a network interface unit that sends to the server the interrogation request message and receives answers and interrogation request messages from the server;*

*the server comprising:*

*a processor that receives the interrogation request message, checks a storage area for a corresponding second identifier, and when a second identifier is not registered, forwards the interrogation request;*

*network interface unit for transferring the interrogation request message including the first value indicative of the request and the first identifier to a plurality of terminals, and receiving, in response to the interrogation request message, an answer including a second identifier corresponding to the first identifier from one of the plurality of terminals having it's own second identifier which is not registered in the server; and*

*the storage area for registering a corresponding relationship between the first identifier and the second identifier which has been included in the answer.*

*41. The method of claim 40 wherein a terminal of the plurality of terminals is a plurality of ATM terminals.*

*42. The method of claim 40 wherein the first identifier is a protocol address.*

*43. The method of claim 40 wherein the second identifier is a terminal address.*

* * * * *